United States Patent
Chummun et al.

(10) Patent No.: US 10,382,538 B1
(45) Date of Patent: Aug. 13, 2019

(54) SYSTEM AND METHOD FOR CREATING A DYNAMIC SOCIAL NETWORK

(71) Applicant: KAIROS APP, L.L.C., Redmond, WA (US)

(72) Inventors: Muhammad Riad Chummun, Sammamish, WA (US); Reda Harb, Bellevue, WA (US); Syed Aamir Hamid, Bellevue, WA (US)

(*) Notice: Subject to any disclaimer, the term of this patent is extended or adjusted under 35 U.S.C. 154(b) by 220 days.

(21) Appl. No.: 15/351,639

(22) Filed: Nov. 15, 2016

Related U.S. Application Data

(60) Provisional application No. 62/255,900, filed on Nov. 16, 2015.

(51) Int. Cl.
| | |
|---|---|
| *G06Q 30/02* | (2012.01) |
| *H04L 29/08* | (2006.01) |
| *G06Q 50/12* | (2012.01) |
| *G06Q 50/00* | (2012.01) |

(52) U.S. Cl.
CPC ..... *H04L 67/1044* (2013.01); *G06Q 30/0207* (2013.01); *G06Q 30/0239* (2013.01); *G06Q 50/01* (2013.01); *G06Q 50/12* (2013.01); *H04L 67/10* (2013.01); *H04L 67/1048* (2013.01); *H04L 67/18* (2013.01); *H04L 67/26* (2013.01); *H04L 67/306* (2013.01)

(58) Field of Classification Search
CPC ...... G06Q 10/087; G06Q 50/22; G06Q 50/12; G06Q 50/01; G06Q 50/0239; G06Q 30/0207; H04L 29/12009; H04L 65/1006; H04L 67/1061; H04L 9/14; H04L 67/306; H04L 67/26; H04L 67/18; H04L 67/1044; H04W 4/21; H04W 8/005
See application file for complete search history.

(56) References Cited

U.S. PATENT DOCUMENTS

| | | | | |
|---|---|---|---|---|
| 2003/0187918 | A1* | 10/2003 | Burbeck | H04L 29/12009 709/203 |
| 2004/0139001 | A1* | 7/2004 | Henriques | G06Q 10/087 705/39 |
| 2004/0162871 | A1* | 8/2004 | Pabla | H04W 8/005 709/201 |
| 2006/0034195 | A1* | 2/2006 | Blaiotta | H04L 65/1006 370/261 |
| 2012/0324018 | A1* | 12/2012 | Metcalf | H04W 4/21 709/206 |
| 2014/0164776 | A1* | 6/2014 | Hook | H04L 9/14 713/171 |
| 2015/0312335 | A1* | 10/2015 | Ying | H04L 67/1061 709/201 |
| 2017/0024538 | A1* | 1/2017 | Siddiqui | G06Q 50/22 |

* cited by examiner

*Primary Examiner* — Le H Luu

(57) ABSTRACT

Described herein is a transient social network that exists as long as its members are physically together. Members become a part of a private social network, referred to as a Cliq, which is facilitated by the use of an application on participant's mobile devices. The Cliq instance is recorded on a server automatically, storing the place and time of the participants meeting. A meta-identity profile of the Cliq is established and content is recommended or desired content is retrieved upon request.

19 Claims, 27 Drawing Sheets

SYSTEM AND METHOD FOR CREATING A DYNAMIC SOCIAL NETWORK

CROSS REFERENCE TO RELATED APPLICATION(S)

This application claims the benefit of U.S. Provisional Patent Application No. 62/255,900, entitled "Techniques for establishing a transient social network", filed Nov. 16, 2015, which is hereby incorporated by reference in its entirety.

FIELD OF INVENTION

The present invention relates generally to social networks, and particularly to techniques wherein a user can establish real and transient social networks rather than virtual and enduring ones.

BACKGROUND

Traditional social networks establish virtual and enduring connections of people. As connections are added, networks grow and take the character of their members. However, certain members are often more active than others, polarizing the activities on the networks and thus the character of the networks. Information served to the networks is usually personalized per the character of the networks. Since the character of the networks converge to a certain equilibrium, information of the same nature is repeatedly served to the same networks creating a groupthink phenomenon. As a result of these effects, traditional social networks become wearied over time. Users react by switching networks (e.g., teens leaving Facebook, flocking to Snapchat). The market reacts by offering specialized networks to focused segments (e.g., LinkedIn to the business segment, Snapchat to a younger segment, etc.) Social network companies react by acquiring other networks that are serving segments they are losing (e.g., Facebook acquisition of WhatsApp). However, specialization and acquisition only postpone the weariness problem. The current invention offers an innovative solution to the weariness problem by establishing real and transient social networks that mimic the real life connections of people, offering a shift from space-based to time-based networks.

SUMMARY

Disclosed herein is a transient digital social network. The transient digital social network exists as long as its members are physically together. In an exemplary embodiment the members become a part of a private social network, referred to as a "Cliq", which is facilitated by the use of a software application that executes or runs on mobile devices of the participants or users. Example of mobile devices includes but not limited to, mobile phones, tablets, smart watches, e-readers, notebooks, etc. The Cliq instance is saved in a database, such as an online database, or locally on users' devices, and contains information about the Cliq such as the place and time of the participants meeting, as well as the identity of the participants, the Cliq initiator (e.g., who started the Cliq), the invitees, the invitees who accepted to join the Cliq, the invitees who declined to join the Cliq, etc. Participants may also augment the Cliq record with the meeting purpose or other notes particular to each Cliq. Further, the Cliq record can be automatically augmented by an algorithm running on a server(s) that adds additional information to the Cliq record, such as contextual information obtained from public domains (e.g. search engines, news portals, public data on social websites, etc.). An example of contextual information would be the news headlines or hashtags trending on social media (e.g., Twitter) at the time the Cliq was created or during the life of the Cliq. A summary of the Cliq record can be posted or published to other sites (such as a social networking profile or Facebook page of a business). Summary of the Cliq records can be also be made visible within the "Cliq" software application, via a user interface, to users of the "Cliq" software application. Records and details of all established Cliqs can also be searched, can be set to private or public. If private, only members of the actual Cliq can find it and view its details, unless the Cliq was also shared with specific members, in which case these members can also see the content of the Cliq record.

For each Cliq, a meta-identity is created by combining and weighing the attributes of the profiles of the individual participants. Example of such attributes include sex, age, location, interests or hobbies, recent activities, music preferences, movie preferences, current job, job history, etc. Other factors from the Cliq record can be taken into account when creating a meta-identity. For example, the time, day, and location of the Cliq, major events happening around the world at the time the Cliq is created, etc. Examples of events include, but not limited to, Olympic Games, Soccer World Cup, a football game, etc. News articles addressing important events can also get associated with a Cliq. For example, a Cliq that is formed on the fourth of July at 1:00 p.m. between Jessica A, Chris B, Maria C, and Steve D, in Santa Clara, Calif. can reveal that all participants are likely to go out for drinks where there are Independence Day celebrations. The server can then send relevant data, including media content and advertising, to all Cliq participants based on the Cliq's meta-identity. The server can also send coupons or promotions that are tailored to the Cliq's meta-identity. Another example could be a Cliq of 3 teens attending the same school and enjoying similar music might receive information about the school, clips of popular songs in a chosen genre, advertisements or coupons for teen clothing, and real-time, customized, group coupons. In one embodiment, the coupons are group-based and can only be honored if at least one condition is met. For example, a coupon generating module that issues a coupon on behalf of a restaurant called "Yummy Pizza" to a group of 3 teens, can be honored if all 3 teens go to eat at the restaurant. In another embodiment, the coupon has an expiration date or time. For example, the coupon can only be honored if redeemed by a certain date or within x-minutes of issuance or while the Cliq is active. For example, the server can specify that the coupon can only be honored if redeemed in the next 90 minutes. A Cliq can be initiated locally, i.e. when the participants are present at the same location, or remotely. When a user wants to initiate a Cliq remotely, i.e., with participants who are not in the same vicinity, the user simply searches for the users that he or she wants to invite, via the "Cliq" software application and an invitation is then sent out to invitees. The "Cliq" initiator can search the contact database of his or her mobile device or manually enter the contact information of a person to invite that person into the Cliq. When a user wants to initiate a Cliq locally, i.e., with participants who are in the same vicinity, the user initiates the Cliq by establishing a wireless contact with the participants. The Cliq is automatically disbanded when the participants go their own way although the server retains the Cliq record for later access and analysis. A number of existing techniques can establish a Cliq instance. Users can instantiate a Cliq via their mobile phones' NFC (near-field communication), LE Bluetooth (low power Bluetooth), Wi-Fi Direct, Wi-Fi, or any other communication protocol that allows the exchange of data between devices. The Cliq is disbanded when a location threshold between the participants is exceeded. For example, after establishing a Cliq, the Cliq is disbanded when the members or participants are located within x miles from each other, where is x a positive number and could include decimal points such as 0.5, 0.7, 1.1, 1.2, 3.0 miles, etc. The Cliq can also be disbanded manually, for example, by the person that initiated the Cliq and/or any of the participants, or delegated to a specific member or participant of the Cliq (e.g. assistant who set up the Cliq on someone else's behalf). In some embodiments, the Cliq exists as long as at least 2 members are still present. In this case, the number of participants in the "Cliq" decrease whenever a participant or a member checks out. The "Cliq" history can reflect that, by noting that at a specific time, a specific member left the Cliq, and update the number of participants tagged to the Cliq to reflect the accurate number of people currently in the Cliq. The creation of the Cliq, the period during which the Cliq is active followed by the disbanding of the Cliq make the Cliq a transient social network. Since the meta-identity of the Cliq is valid only as long as the Cliq is active and since a Cliq participant is served information or content based on that transient meta-identity, the content is independent across Cliqs where the same person participates over time. This ensures that not the same information or content is served to the same participant in her social networks, hence avoiding the groupthink problem or the Filter Bubble problem.

In another exemplary embodiment, a Cliq can be expanded to include everybody within a certain physical perimeter defined by a certain distance radius. In this embodiment, the Cliq does not restrict access to specific persons; instead it acts as a localized public network. Such a Cliq is referred to as a Klatch. The Klatch can be started automatically when a random group of people are at the same location. For example, in a grocery store, at a stadium, in a school, at the mall, at the airport, etc. Members within the Klatch can communicate with each other or with the venue managers. The venue managers can communicate with the members enabling relevant information, content, coupons, and advertisements to be served. The Klatch takes the meta-identity of the individual identities of the Klatch participants. Content served to the Klatch participants is selected based on the meta-identity. Hence, a Klatch of stadium goers may receive coupons to future games of the home team. Further, the Klatch may serve game statistics based on the current game score as that contextual information is added to the Klatch meta-identity. In another embodiment, a Klatch is formed in a supermarket and the Klatch takes the meta-identity of all the shoppers. Say the Klatch is formed in the morning on a weekday where most shoppers are housewives. The Klatch will take a meta-identity with a strong component of this profile and can thus serve information or ads more relevant to mothers shopping for the family.

BRIEF DESCRIPTION OF THE DRAWING(S)

FIG. 4 depicts the "Share Contact" button and the new page it takes the user to.

FIG. 6 depicts the "Query" button and the new page it takes the user to.

DETAILED DESCRIPTION OF THE PREFERRED EMBODIMENT(S)

The following description is intended to convey an understanding of the invention by providing a number of specific embodiments. It is understood, however, that the invention is not limited to these exemplary embodiments and details.

The "Cliq" application can be a standalone application or can be a component of an application that offers additional functionalities such as Klatch discussed above. Users or participants can download/install the software application (also referred to as app) to their mobile devices, which include cellular phones, tablets, notebooks, netbooks, smart watch, or other such handheld personal devices. Users may also access the Cliq application from a desktop, laptop, notebook, etc. using Internet browsers that are well known in the art, such as Firefox, Internet Explorer, Chrome, Safari, etc. Users can download the application to their mobile devices by connecting to "app stores" to search for, find, and download the application. Users can also be automatically linked to such "app stores" by scanning a QR code or clicking on a link in an electronic message, including text messages (SMS) and emails. Examples of existing app stores include App Stores operated by Apple, and Google Play Store, also known as "Google Play" operated by Google, or any digital distribution service that allows users to browse and download apps that can execute on their computing or mobile devices. The "Cliq" application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Figure 1:
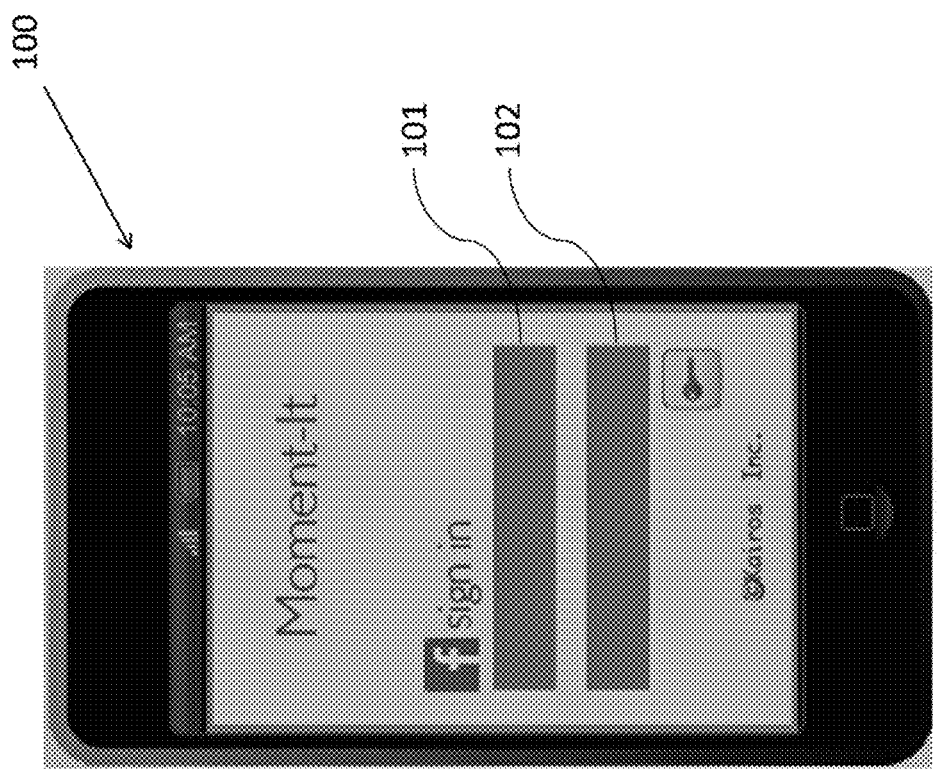
FIG. 1 depicts the authentication screen whereby a user's information would be gathered from their other social media account.

FIG. 1 illustrates the sign-up process. When a user downloads the software application, the user can sign-in via a supported platform(s). For example, the user can log in via a social network that they are already part of (e.g. Twitter, Facebook, Tumblr, etc.). Users may also use federated identities to automatically sign in the app if they are already signed up with a participating app, e.g., if they are already signed into Facebook on their device, they may be automatically signed in the Cliq app. Users can also create an account with Cliq and import their friends contact list or simply link to (interface with) an existing friends contact list. Users that sign-in or authenticate themselves via a supported platform (e.g. sign-in via Facebook) will benefit from an automated collection of information hosted by that platform about the users, such as their name, sex, location, likes, interests, etc. and can quickly access their friend's list on that platform.

In one embodiment, a unique composite identity of the user is created by collecting variables (also known as attributes) from their social networking profiles. For example, the user's name (Var1), Gender (Var2), Birth Date (Var3), Lives at (Var4), Works at (Var5), and Studie(d/s) at (Var6), interests, (Var7), favorite songs (Var8), favorite movies (Var9), favorite holiday or holidays (Var10), etc. are used to build the composite identity. Additional data is collected, such as recent activities, posts he/she liked or commented on, places the user checked-in at, a scan of the user's latest posts, or all available/accessible posts, to collect more attributes about the user (Var11, Var12, etc.). Further, information about the user can be collected on the public domain, e.g., comments left by the user online (Var13), likes by the user on other social media platform (Var 14), information about the user collected and sold by services such as Intellus, etc. (Var15), etc. Also, some information such as location of the user can be determined and collected from the mobile device of the user. A composite identity profile is initially created from collecting all such data. Such composite identity represents a model or profile of the user attributes and can be edited, updated, and refined when any variable changes (e.g. location, interests, etc.) or new variables are added or become known. The model or profile can also be edited manually by the user according to their preferences and customization. For example, the user can correct the data analytics software that automatically computed the user's composite identity. For example, the user can choose to choose to change a predicted music genre, by removing "pop music" from interest and adding "rock music" or the user may elect to not disclose a variable or have a variable not be part of the composite identity (opt-out).

Similarly, a meta-identity profile for a Cliq with two or more members (participants) can be automatically created upon Cliq formation by algorithmically combining the composite identities of each user in the Cliq. Per this algorithm, the Cliq meta-identity is a weighted function of the member's composite identities. In some instances, common attributes between the members may be given higher weight than attributes that are unique to only one member. There are occasions, however, when the meta-identity takes advantage of attributes unique to a specific member if it is determined that other members in the Cliq might also have that attribute, even if it is not explicit in their profiles. For example, if one user lists Independence Day as their favorite holiday, and the Cliq is formed on Independence Day (fourth of July in the United States of America), then this attribute will be given a weight that is higher than what unique attributes are given. For example, Independence Day can be added to the meta-identity profile as a critical attribute. Another example, a "Cliq" of 3 teens attending the same school and enjoying similar music would result in a meta-identity associated with the school name and the music genre. Another example would be to use probabilistic and stochastic functions to compute the meta-identity. Further, the algorithm will use machine learning or Artificial Intelligence (AI) techniques to produce the meta-identity from the users' composite identities and to produce the composite identities from the individual variables (Vars) described above. In any case, the meta-identity algorithm is expected to be complex, dynamic and to evolve over time and to involve a number of techniques to be computed. Established Cliq can be shared on social networks, and users can define what to share. For example, a post can be shared that indicates a Cliq name, members, and location.

Upon signing-in, the user can start a Cliq by inviting people to it. For example, if the user logs in via his/her Facebook account, the user will be able to access his/her friend's list (buddy list) and choose who to invite to the Cliq. The user can also access his/her own phonebook (e.g. local phonebook or cloud-based phonebook) to add additional members that might not be on Facebook. The user can narrow down the search by typing in names of the desired friend instead of going through a long list, or the user can click on a "Near me" tab that lists friends that are in proximity to the user. The user can query the system to only display people located within an x-mile radius, such as within 3 miles of the "Cliq" initiator location. The user can also simply type in the phone number or an email of a friend who is not in his contacts and invite him or her. An invitation is then sent out to the members included in the Cliq. Notifications can consist of SMS text messages to the members that do not have the Cliq application installed on their devices along with a link to download the app, or notification can be simple alerts associated with the Cliq application when installed on participants' devices. Invited users can then choose to join or to decline to join a Cliq. Invitees can also choose "tentative" option. To get an accurate number of people in the "Cliq", the Cliq initiator can manually adjust the number of people to reflect those that want to join but don't have the "Cliq" application downloaded.

Figure 2:
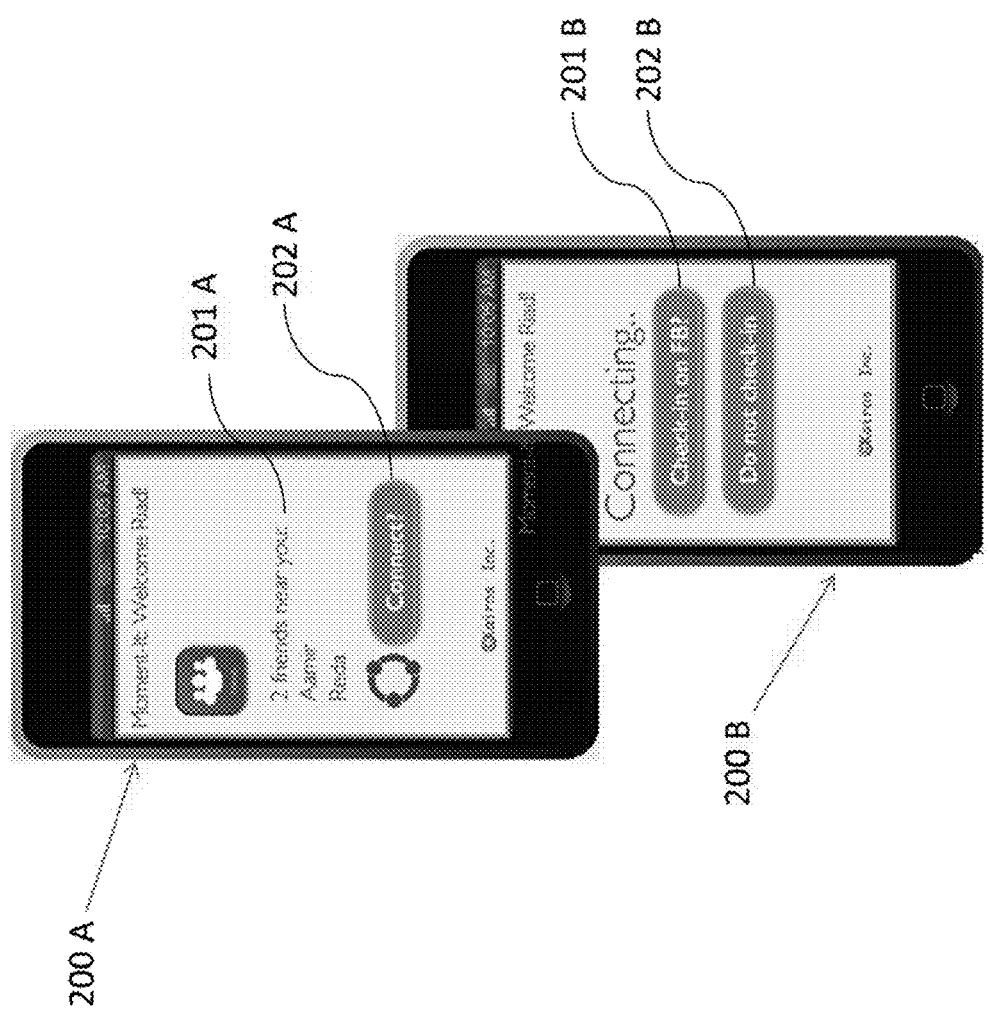
FIG. 2 depicts the instantiation phase whereby users can choose to connect to form a Cliq and the option to "Check-In" via their traditional social media account.

FIG. 2 illustrates the Cliq initiation screen, where users can see who is part of the Cliq they can join and can choose to post the record with other social services (e.g. Facebook).

Figure 3:
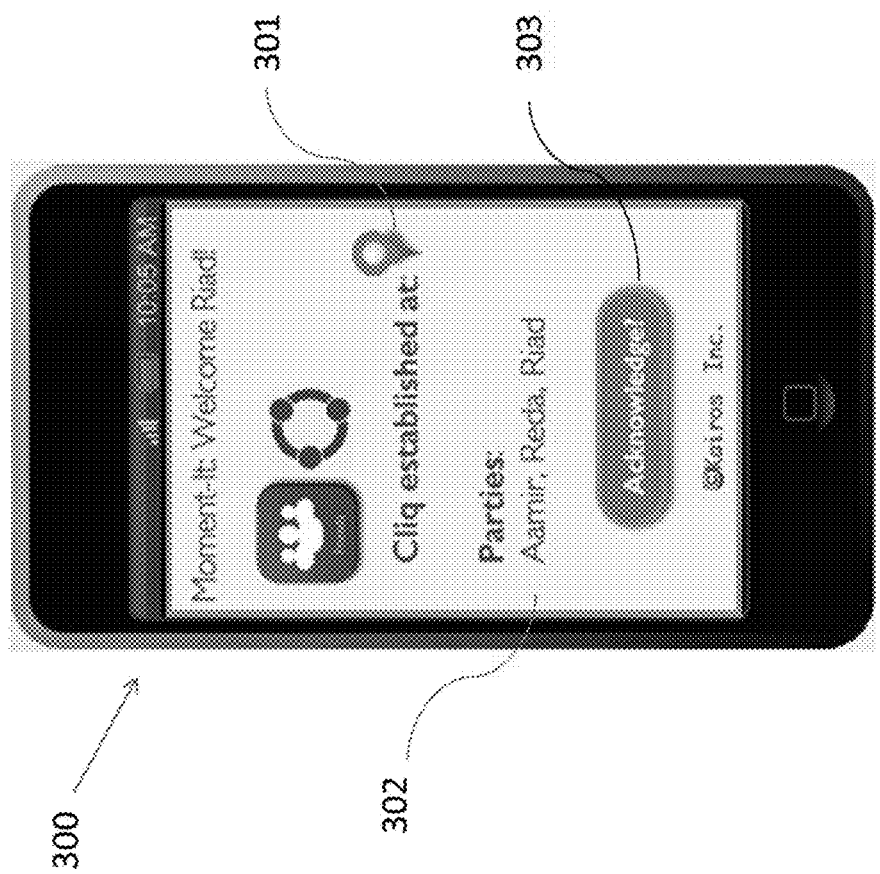
FIG. 3 depicts the notification a user receives when a Cliq has been established.

FIG. 3 Users can see the location at which the Cliq was formed 301 as well as the parties invited to it or who joined in that Cliq 302. If the information displayed for the location 301 and the parties 302 are correct, the user can confirm that it is correct via the acknowledge button 303.

In some embodiments, users that are part of the same Cliq can send each other messages via the in-app messaging service. Users may decide to communicate this way before deciding to join the Cliq or they may communicate this way after joining the Cliq.

In some embodiments, a user can start or instantiate a Cliq without inviting anyone specific, but rather give the opportunity to nearby friends or the public to join. A notification or alert is then dispersed and received by other users that meet criteria(s) defined by the user that started the Cliq. For example, the user that started the Cliq can decide who gets these notifications as the application allows filtering by friend criteria and geographical radius. If invitation is open to any member of the "Cliq" network, then users will only receive open invitations if their settings allow invitations from unknown parties, or if the invitation is within a certain location or within a predefined distance (e.g. 2 miles within their location), or "Cliq" is concerned with a specific activity, such as hiking. If no predefined parameters are set, then users can receive all invitations that were declared public.

In some embodiments, the Cliq is public and can be seen by anyone that is a member of the Cliq social network. This is particularly useful for scenarios where the user that initiated the Cliq is looking for a nearby user with a common interest or goal. For example, a user that wants to share a cab in-order to split the cost might be looking for someone heading the same direction as them or the user is looking for somebody to go out to lunch with or looking for someone with a composite identity matching his or her own composite identity.

Cliq names are automatically created based on the person creating the Cliq and Cliqs are automatically given a unique ID so that the Cliq record can be retrieved later. Cliq names can also be entered manually to further explain the purpose of the Cliq. Therefore, the Cliq initiator can edit the automatically generated name. For example, a Cliq user called Mike who wants to find a nearby user so that they can share a Taxi to San Jose International Airport, from Santa Clara, can create a Cliq called "Mike—Looking to share a cab to SJC". In this scenario, the Cliq may only show up on a specific channel or page within the Cliq system, such as under (Transportation—Taxi—Airport). Invitees that join a "Cliq" can change the name of the "Cliq" if they wish to post to another social network, since the "Cliq" is tied to a unique ID, the "Cliq" record will not be a duplicate.

Figure 4:
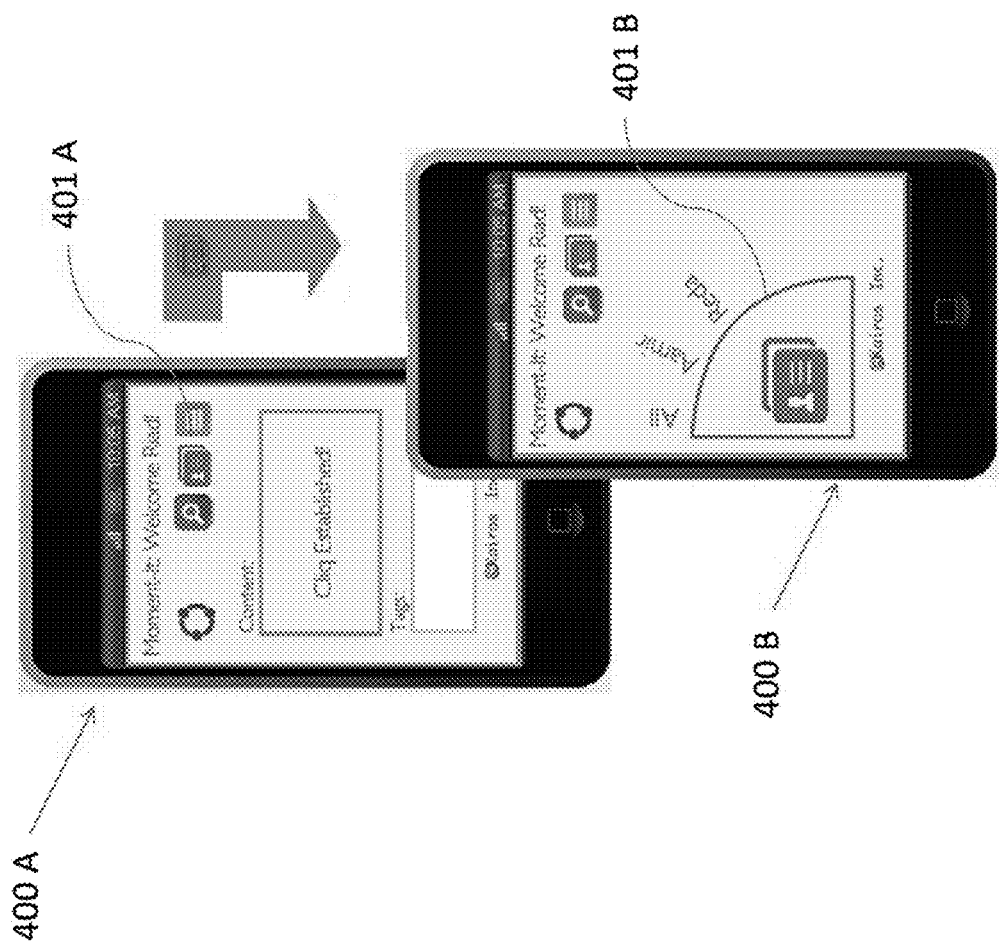

FIG. 4 The "Share Contact" button 401A takes the user to a new screen 400B where they can choose to share their contact information with one individual, or all parties in a Cliq 401B. This contact information consists of information gathered from Facebook or the participants' mobile device itself or can be edited by the user before sharing.

Figure 5:
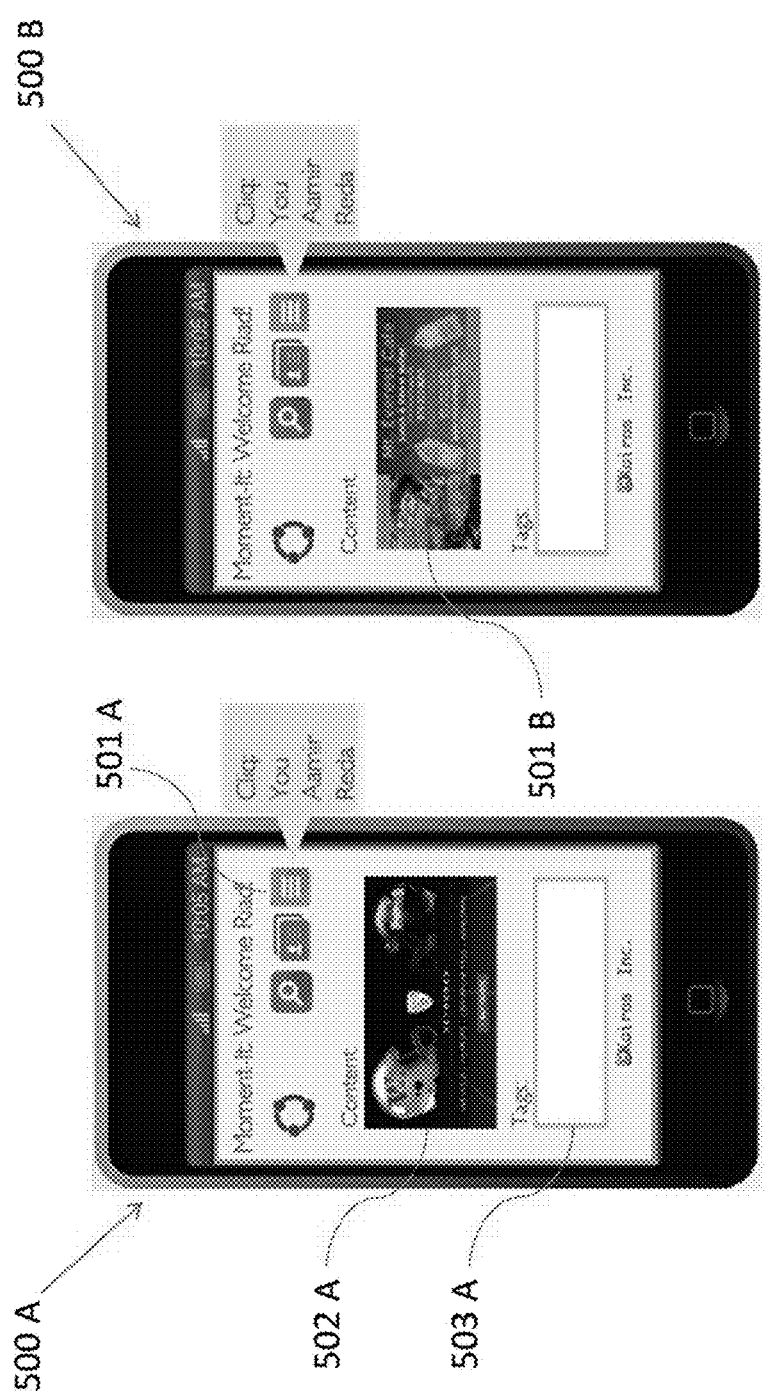
FIG. 5 depicts the session screen where content is displayed and participants can post tags after a Cliq is formed.

FIG. 5 Cliq parties are able to view a list of members currently included by clicking on the parties button 501A. Further, users are able to post tags 503A that augment their Cliq profile. Recommended content 502A is pushed or sent to a Cliq from a server based on their meta-identity profile. For example, if the Cliq profile shares a common University, tickets to that University's Football game might be available at a specially discounted price. Content recommendations can include information relevant to the Cliq as well as text, audio, video, and ad content. Examples of such content include news feed, twitter feeds, blog posts, broadcast songs, targeted songs, broadcast video, targeted video, advertisements, public messages, general information, location-based data, etc. The content can be from the public domain as well as curated or paid for content. The content is served to the Cliq by the server monitoring the Cliq. Vendors, such as restaurants, malls, stadiums, etc., can pay or subscribe to have their content pushed or sent to the Cliq. If a user clicks on the content, a pre-determined action, such as a ticket purchase takes place. Further, participating restaurants and other establishments can offer variable rate coupons based on the size of Cliq parties 501B. For example, offering higher coupon rates to larger parties up to a max rate. These establishments can also offer on-the-spot dynamic coupons based on the number and sizes of the Cliqs at or near their locations. For example, offering a better deal to a Cliq that is nearby to attract the Cliq to their business or establishment.

In some embodiments, participating establishments can define parameters that allows the "Cliq" network to automatically offer promotional coupons on their behalf, especially to Cliqs formed in their vicinity and showing interest in the particular establishment (e.g. searching for the particular establishment, or searching for information on a competitor, etc.). For example, a restaurant can supply the Cliq system with parameters to automatically offer a 20% discount to any Cliq that includes 2 people between the hours of 4 p.m. and 6 p.m.

In some embodiments, a participating establishment can decide to only offer discounts to customers for the next two hours to increase foot traffic and boost sales. In the above embodiments, the participating establishment is effectively competing or bidding to attract the Cliq's business.

In some embodiments, a user may establish a Cliq with a retailer establishment by querying the retailer for an offer. In this case, the Cliq system could show any coupons that meet the retailer's pre-defined parameters, including customizing an offer for loyal and repeating customers if the retailer supplied any parameters for repeated customers. The Cliq system associates an ID with every Cliq and every Cliq user, so it is feasible to track what offers that the users committed to were honored and the users can be rewarded accordingly.

Figure 6:
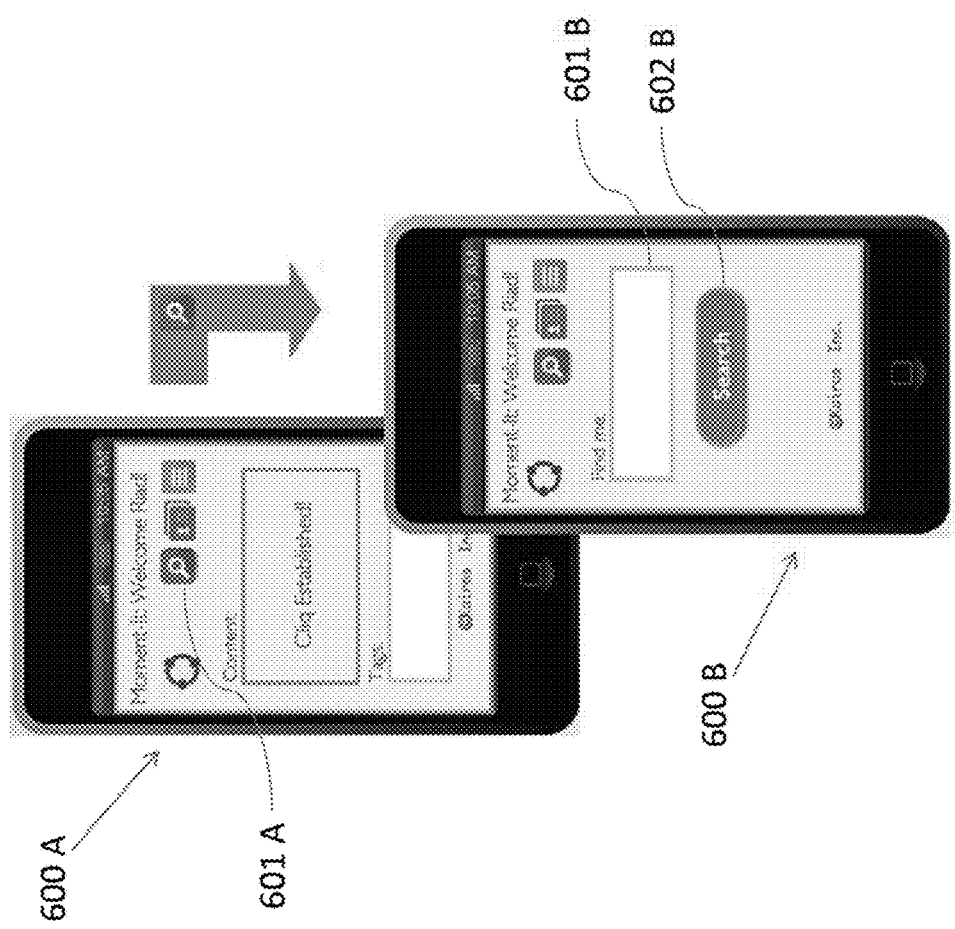

FIG. 6 The user has the ability to request specific information or content via the "Query" button 601A. The query button 601A will take a user to a new page 600B. The user's specific requests are entered in the "Find me" field 601B. Once a user has entered the desired search information they press the search button 602B. A user's query functions as a special tag that updates the meta-identity of the profile and has priority over other tags while generating content or ads. For example, a user can query for "Indian food" and receive coupons from nearby restaurants. This data can come from a pre-configured database populated with deals from participating establishments or deals that are generated dynamically based on factors such as number of people in the Cliq, available tables at nearby Indian food restaurants, etc. In this embodiment, the user is overriding or augmenting the meta-identity of the Cliq by requesting specific content.

Figure 7:
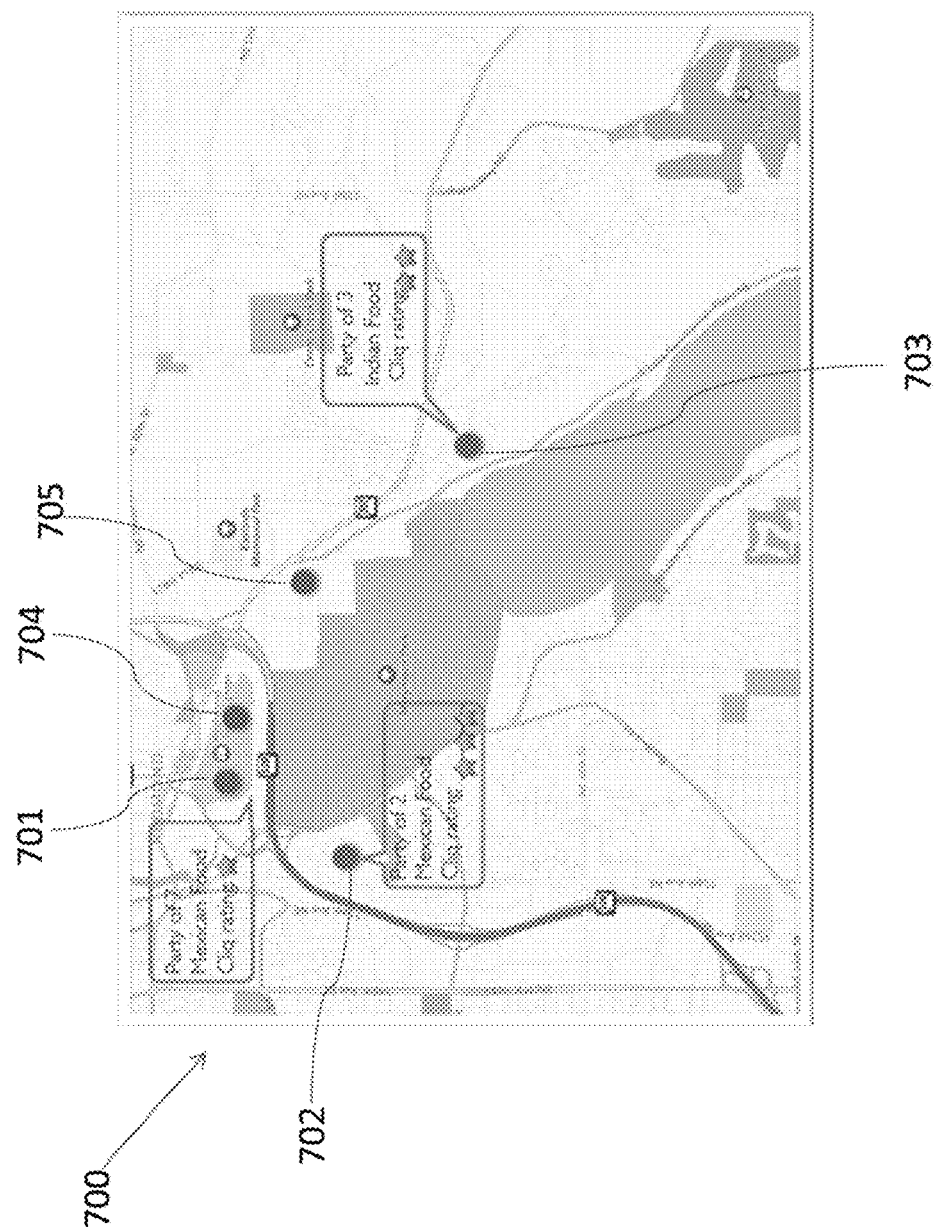
FIG. 7 depicts the map view whereby vendors can see Cliqs, (including their meta-identity profiles and rating from other vendors), and offer deals in real-time.

FIG. 7 Vendors 704, 705 can bid on Cliqs 701, 702, 703, by offering on-the-spot deals. Vendors are able to see the size of Cliqs, their basic meta-identity profiles, and ratings of Cliqs based on prior services rendered and rated by other vendors.

Figure 8:
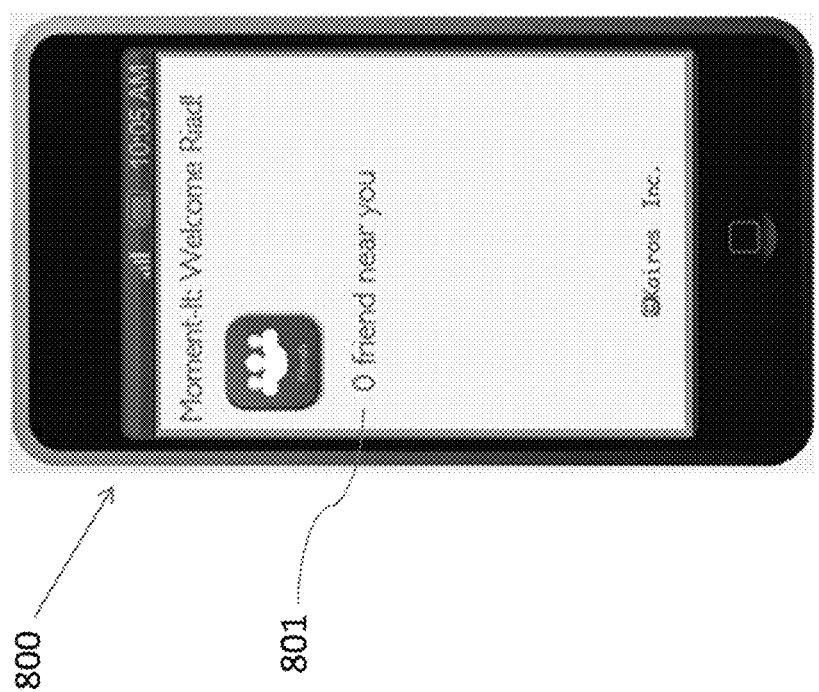
FIG. 8 depicts the screen a user sees after a Cliq has been disbanded and while it is searching for nearby users of the mobile application.

FIG. 8 Cliqs automatically disband once Cliq parties are physically away from each other. After a Cliq is disbanded the application returns to searching for nearby users 801.

Figure 9:
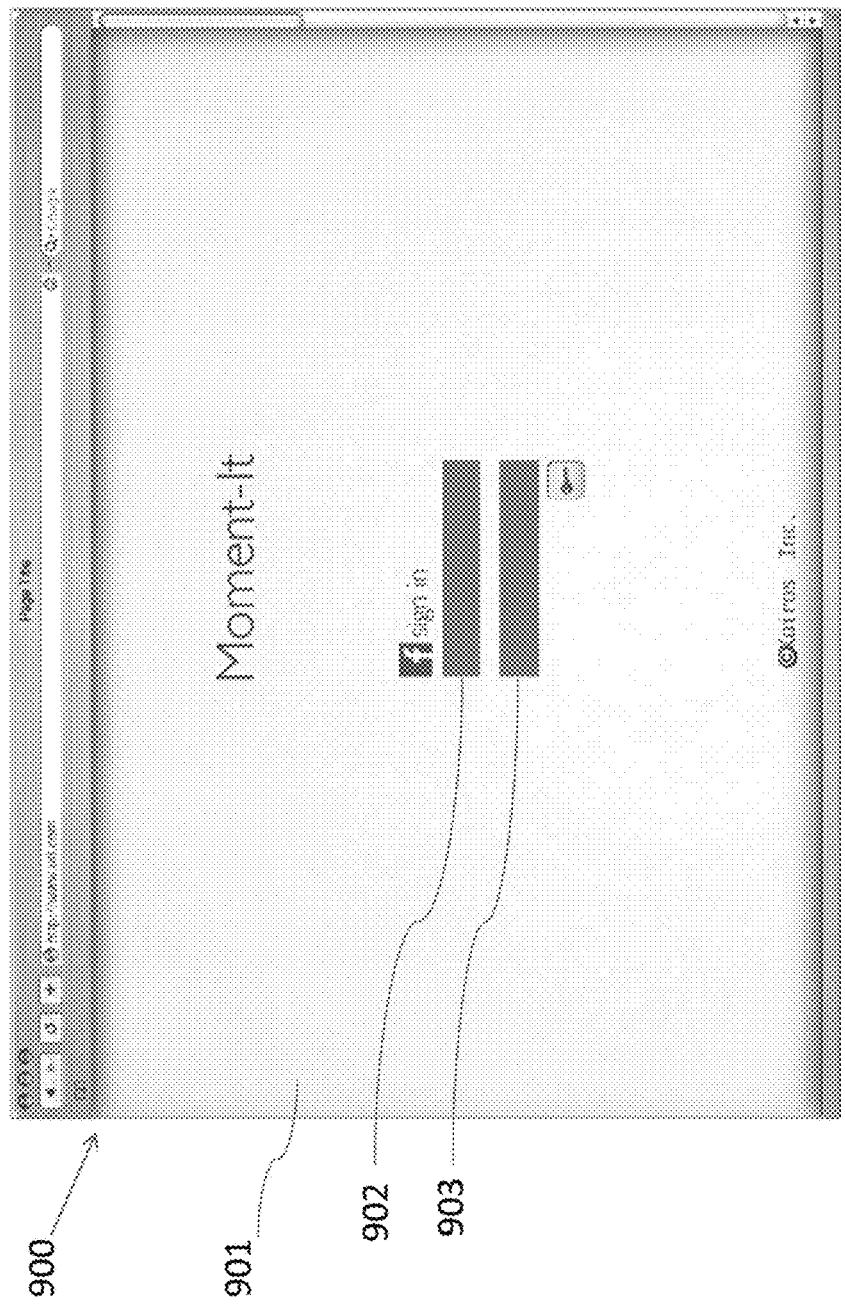
FIG. 9 depicts the authentication page via a web browser.

FIG. 9 The user can access the service and his/her Cliq records via a web browser 900. They can access the information tied to their account after signing in with a username 902 and password 903 on authentication page 901.

Figure 10:
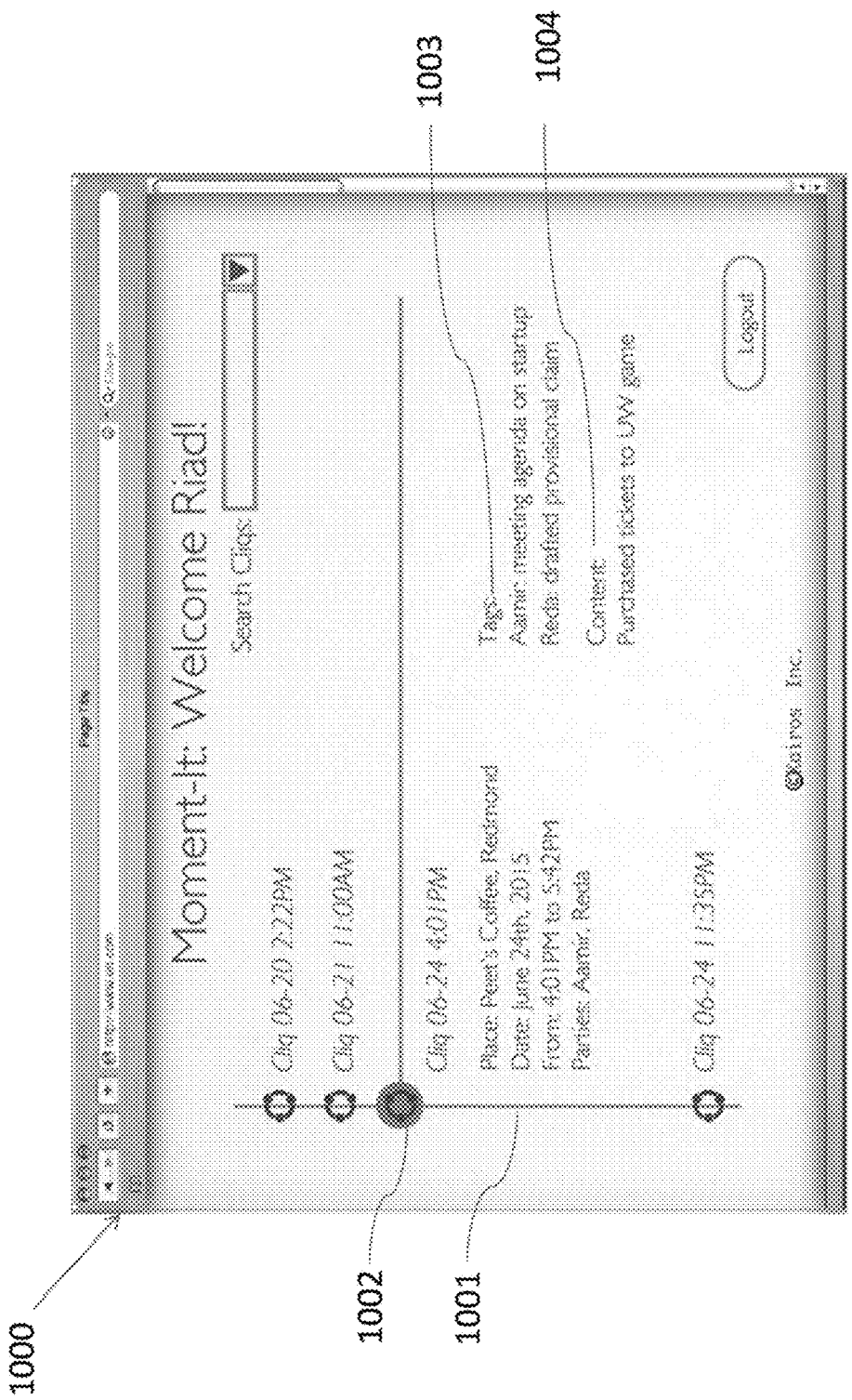
FIG. 10 depicts the record of Cliqs maintained by the server.

FIG. 10 shows the historical Cliqs associated with the user that signed along with details about the Cliqs such as content and tags. Upon dissolution of a "Cliq", a record of the session is generated 1002 that includes the Cliq place, date, time, and members 1001. The record also contains the tags posted 1003, and content consumed 1004.

Figure 11:
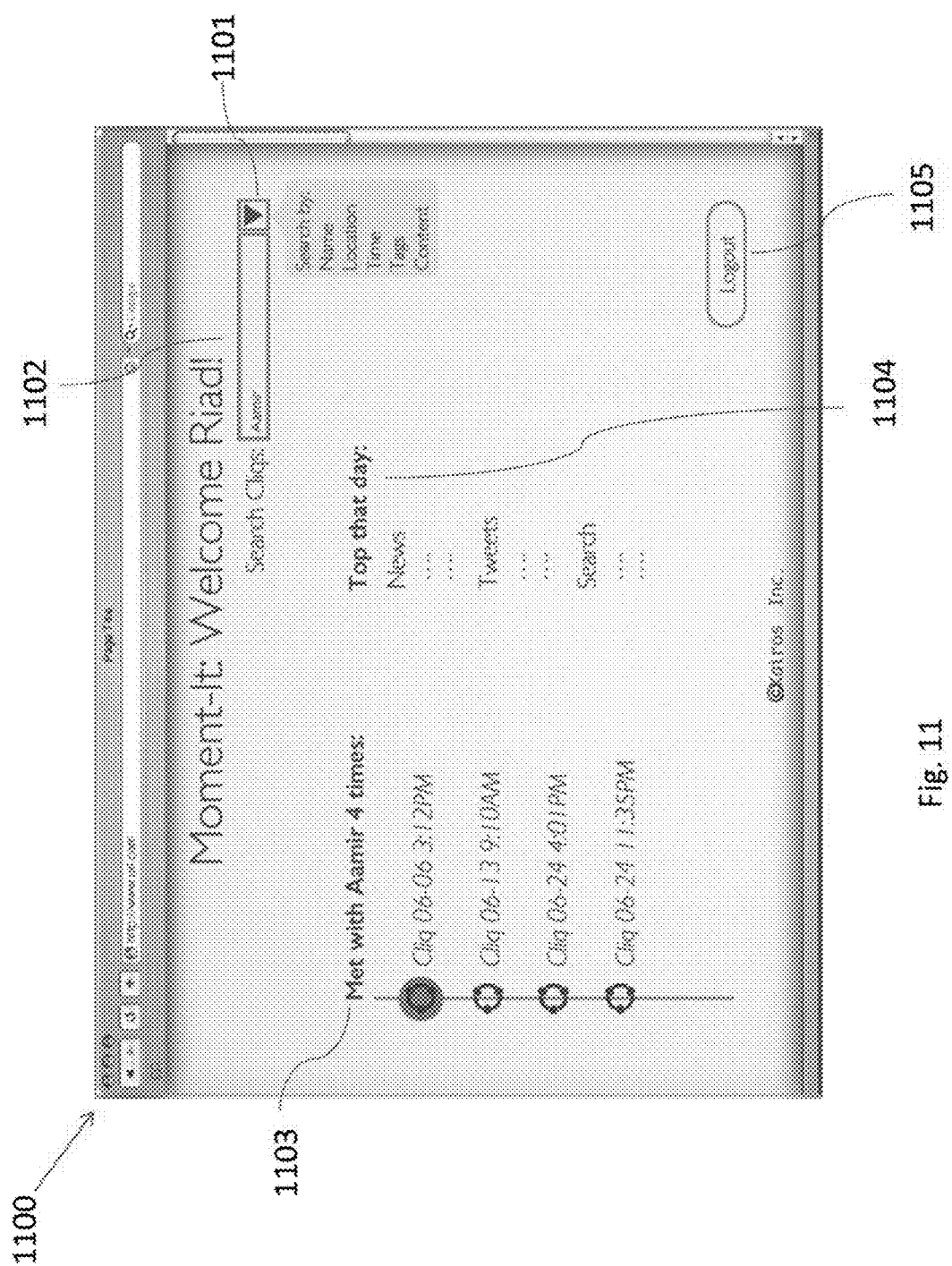
FIG. 11 depicts a search of the recorded Cliq's filtered by name.

FIG. 11 The record is further augmented with the "Top that day" 1104 including: news items, top tweets, and top search items for that location, date, and time. The application then returns to a state of monitoring of other nearby users. The records can be searched 1102 and filtered by name, location, time, tags, and content 1101. When the user has completed their session they can exit the service by pressing the "logout" button 1105. In an embodiment, a user can search his Cliq history for all the Cliqs when he was with a certain person or ate at a certain restaurant or was served a certain content.

Figure 12:
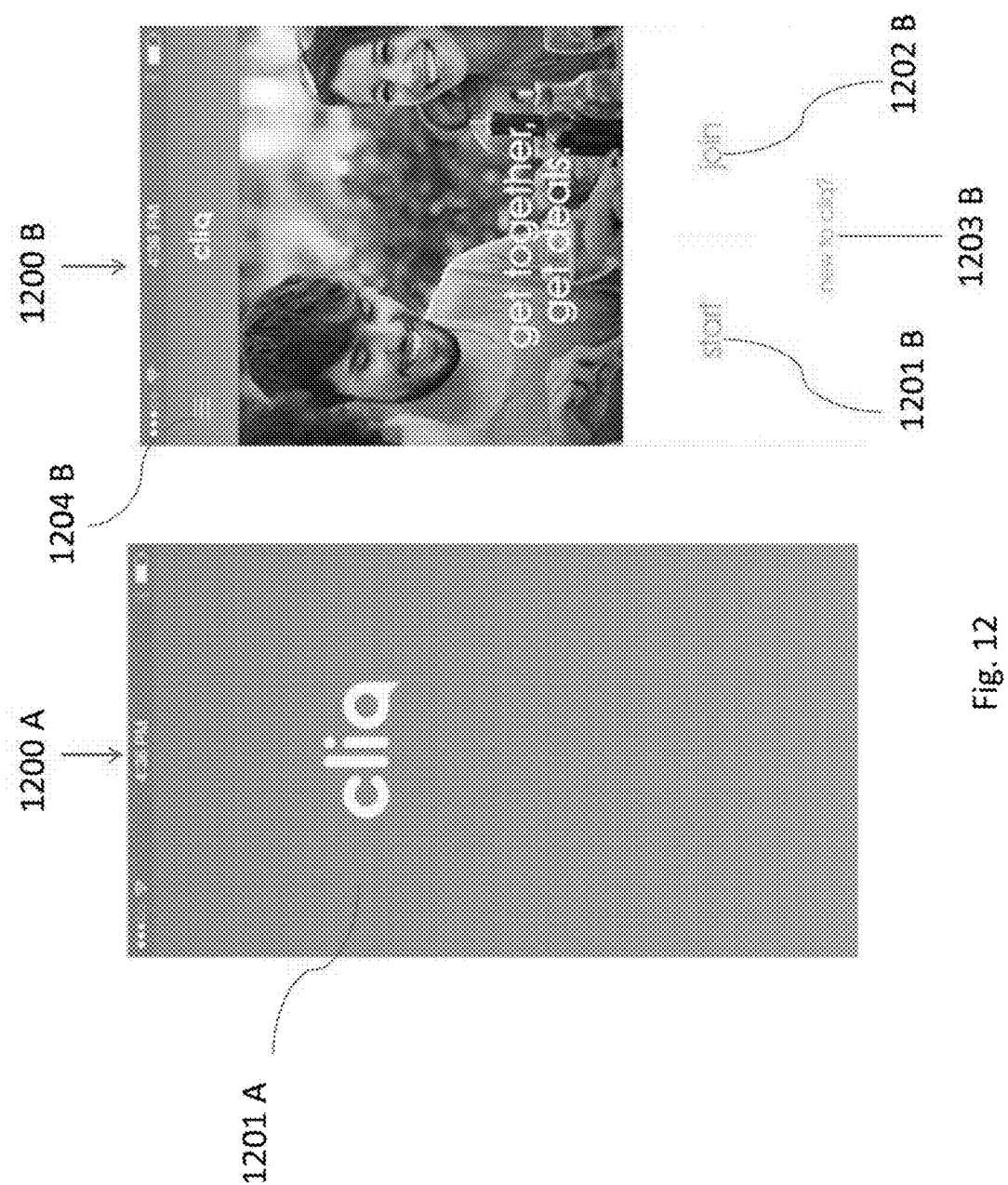
FIG. 12 depicts the mobile application's launch and login screen.
Figure 13B:
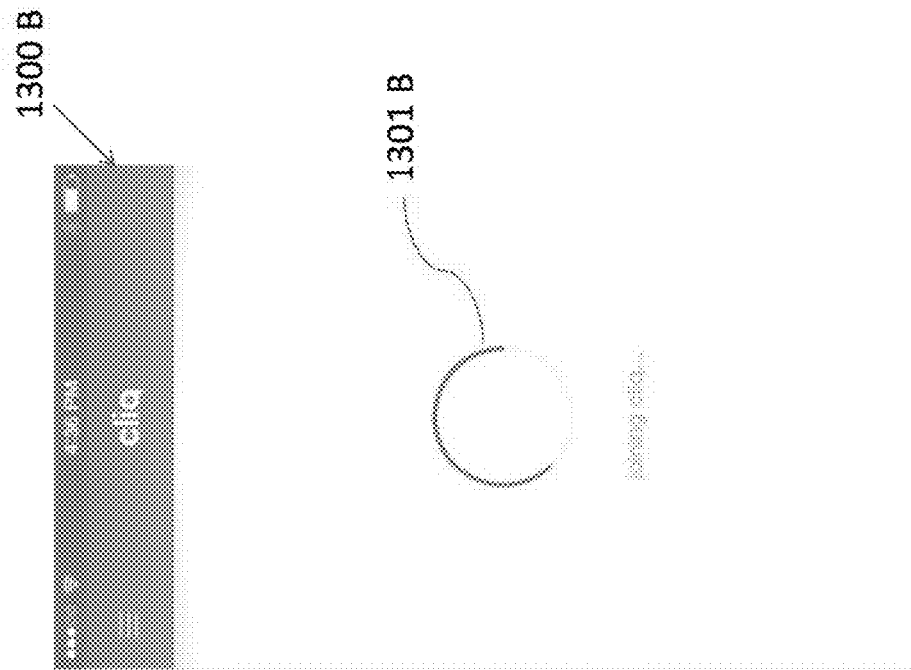
FIG. 13A-13B depicts the loading screens displayed while creating and joining a Cliq respectively.
Figure 13A:
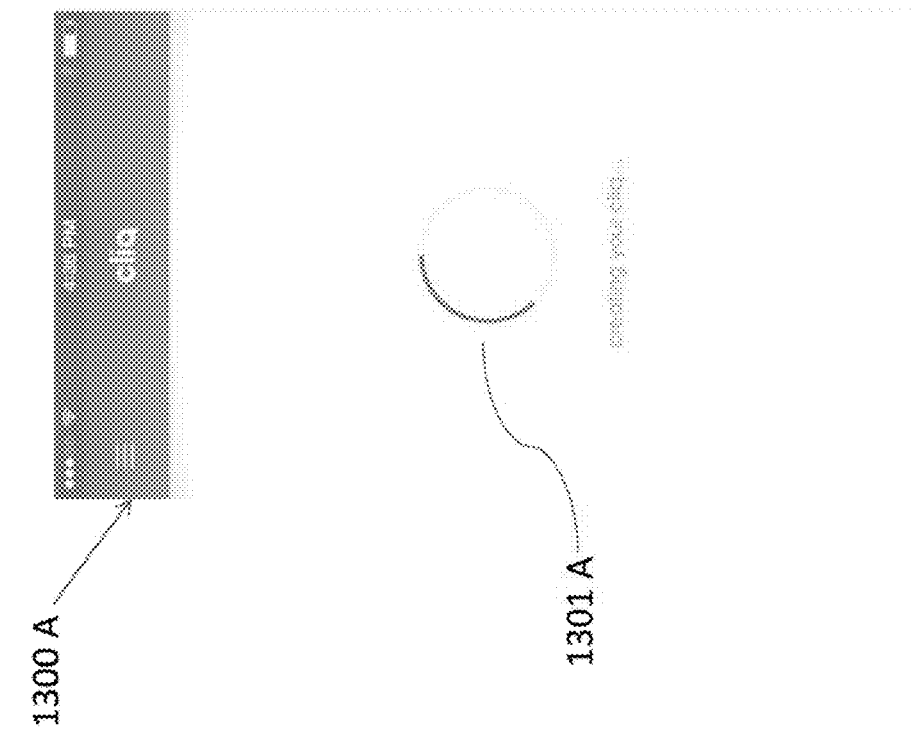

FIG. 12 Once a user launches the Cliq application they are presented with the option to start 1201B or join 1202B a Cliq if they have already registered for the service. If the user needs to create an account, they can click the "new to Cliq" button 1203B. The user can see pending Cliq invite(s) when they press or click on the join button 1202B, or can start his or her own Cliq by pressing or clicking on the start button 1201B FIGS. 13A-13B show the Cliq creation screen when a user is creating a Cliq, and the Cliq joining screen when the user is joining an existing Cliq, respectively.

Figure 14:
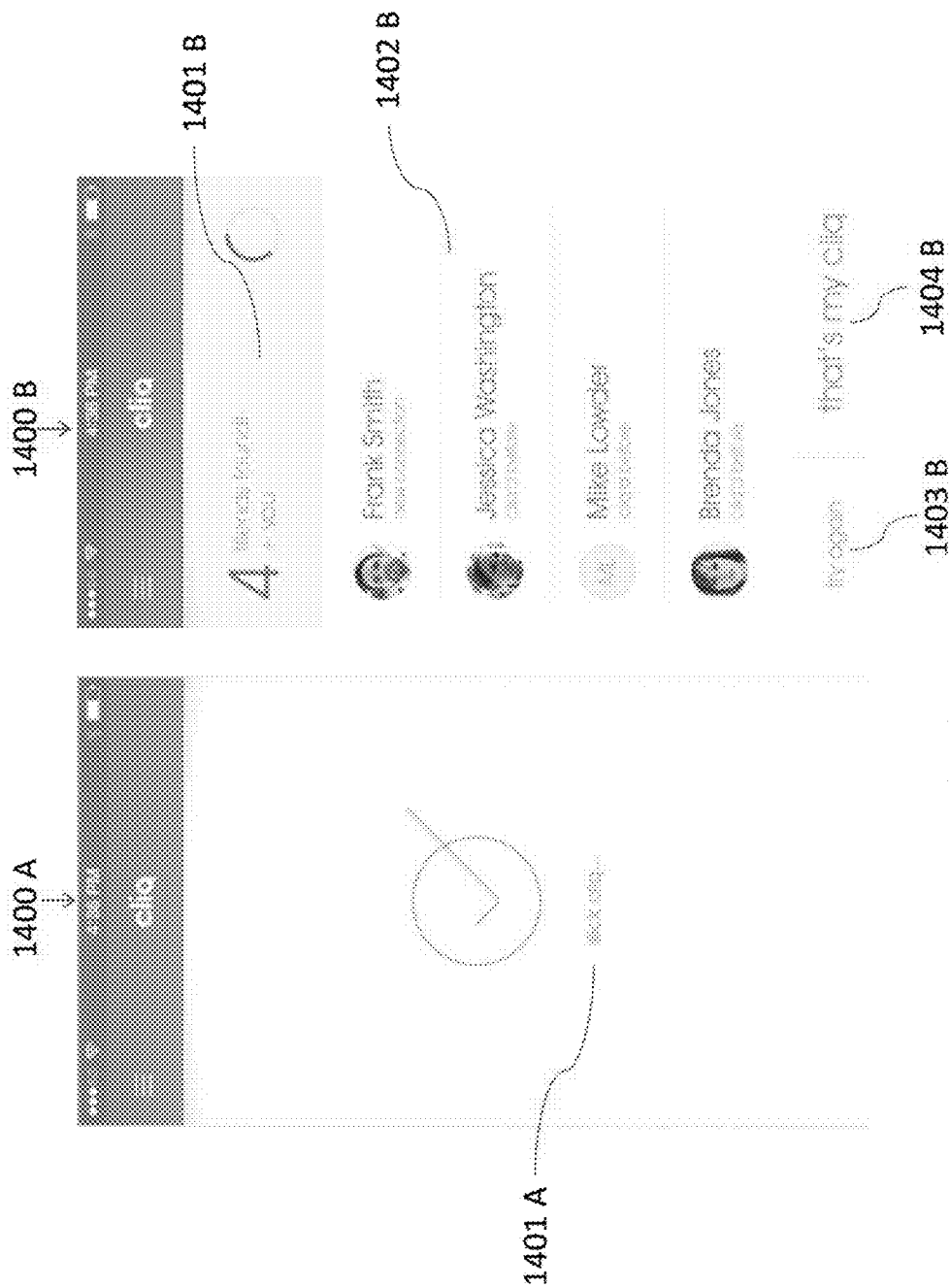
FIG. 14 depicts the successful joining of a named Cliq as well as the screen where a user will confirm or deny the correct group was joined.

FIG. 14 Once a user joins a named Cliq 1401A they are then presented with the option to confirm 1404B that is the group they intended to join or retry 1403B.

Figure 15:
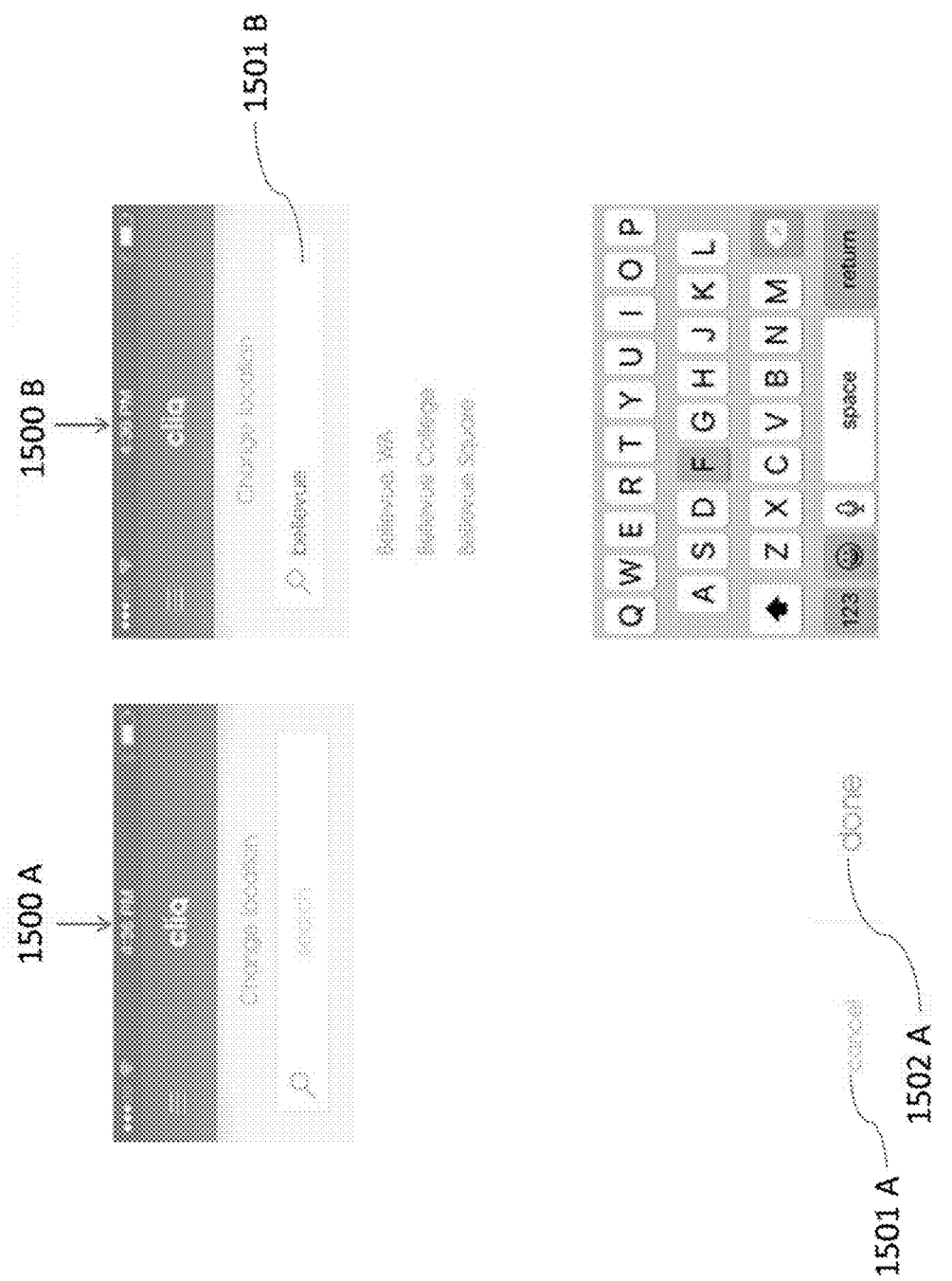
FIG. 15 depicts the ability to search for restaurants by location.

FIG. 15 Once a group is formed they can then search for a restaurant by location 1501B locking in their selection with the "done" button 1502A or canceling to change the location via the "cancel" button 1501A.

Figure 16:
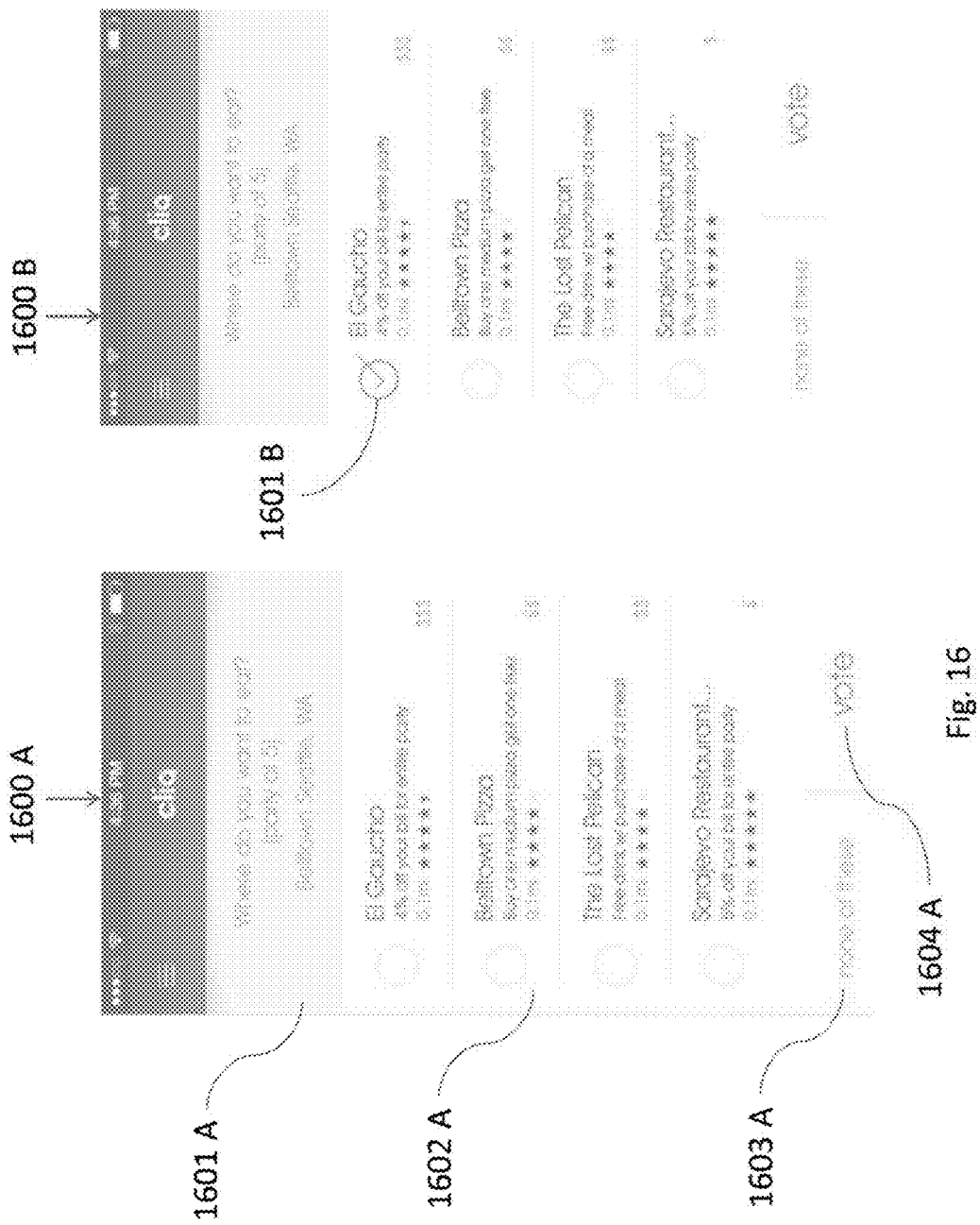
FIG. 16 depicts the list of available restaurants as well as the deals they offer and the check mark confirmation of the user's selection.

FIG. 16 The members of the Cliq vote on the restaurant they would like to eat at. The party size and location restaurant location is displayed at the top of the screen 1601A. The restaurants in the selected location and their coupons are listed 1602A below the party size and location 1601A. The user can then select their restaurant from the list 1062A, the selection is noted by a check mark 1601B. The user can then cast their vote with the "vote" button 1604A or use the "none of these" button 1603A if they are unhappy with the available restaurant lists 1602A and wish to see more. Users who already voted are directed to a loading screen to await the other user's votes.

Figure 17:
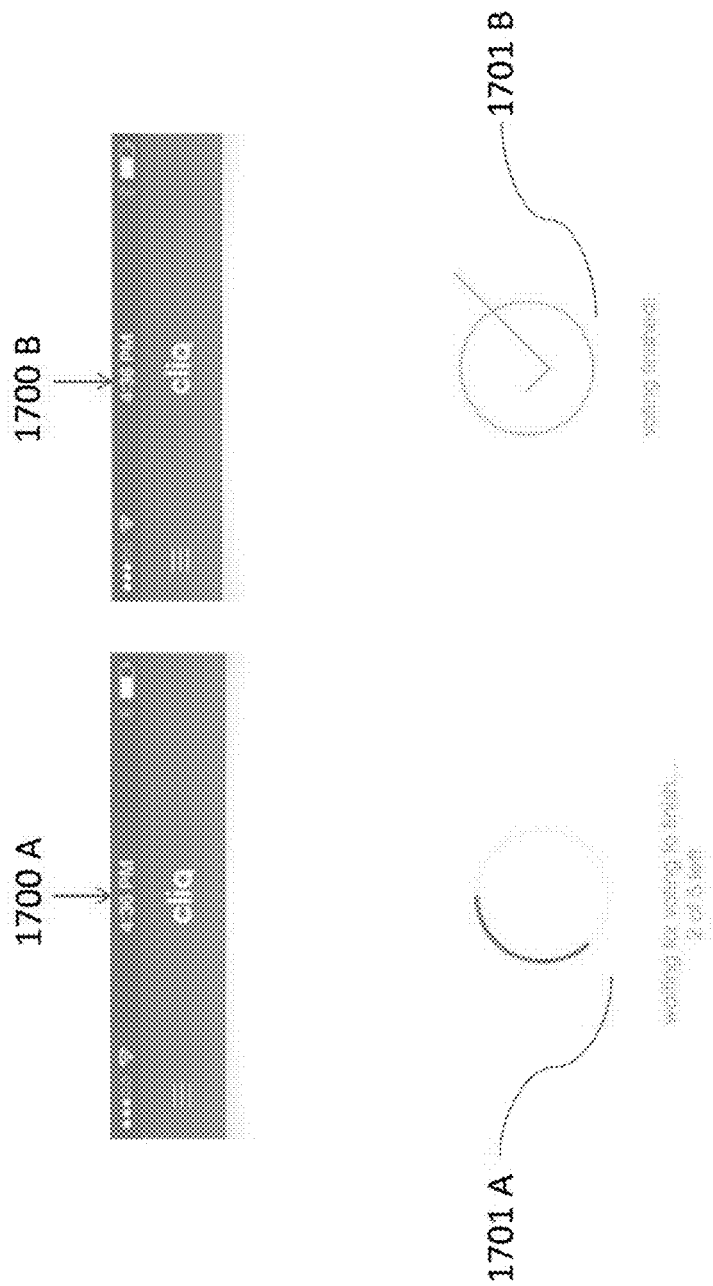
FIG. 17 depicts the current tally of votes cast and pending as well as the confirmation screen when voting is finished.

FIG. 17 After the user cast their vote 1604A they are directed to a loading screen 1701A indicating how many persons still need to vote. When the voting is complete the user is given a confirmation screen 1701B informing them that everyone has voted.

In some embodiments, the user who initiated the "Cliq" can choose the place, such as the restaurant, and not allow voting. In this case, invitees, can either accept or decline.

Figure 18:
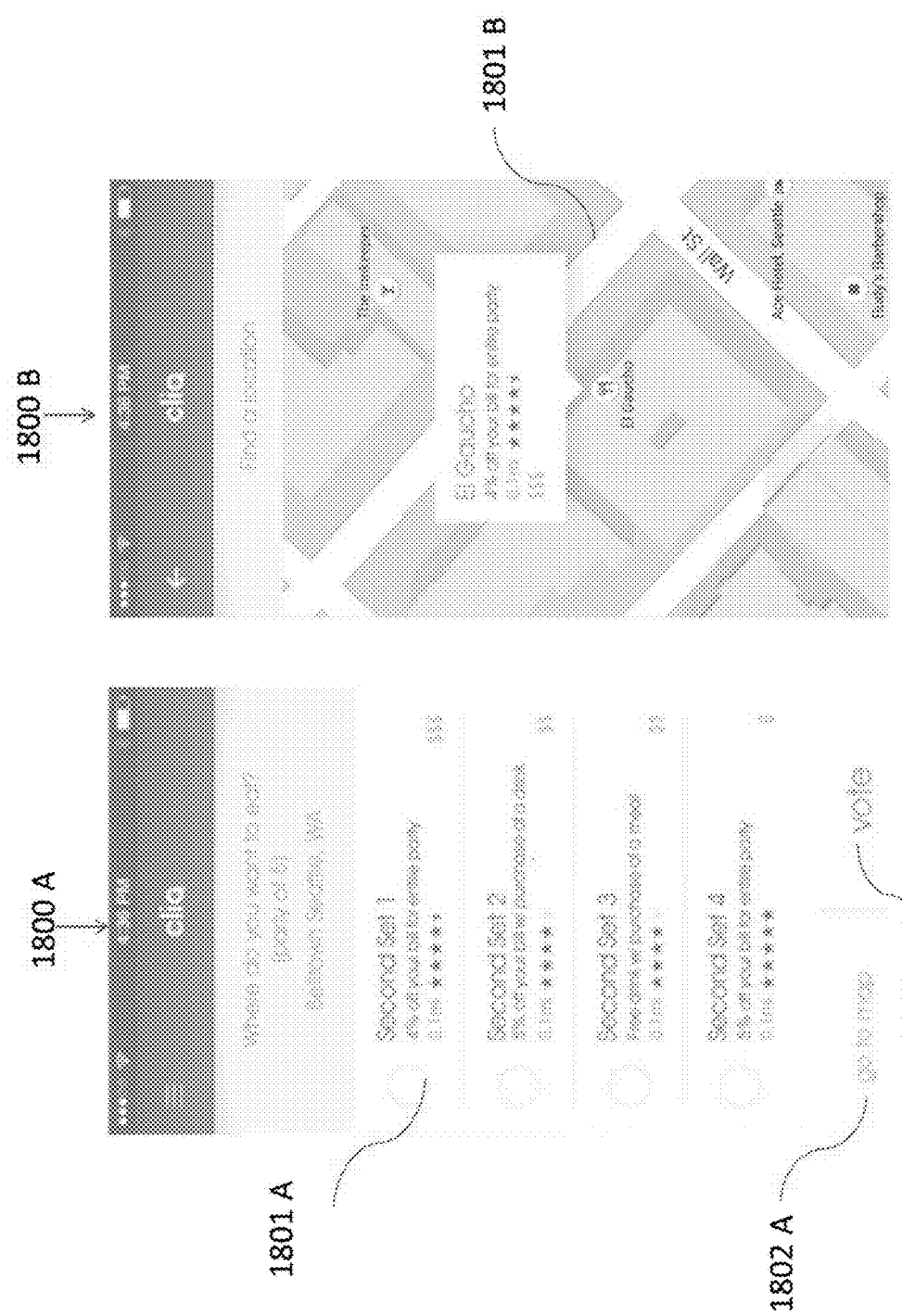
FIG. 18 depicts the screens where a user can see the selected restaurant on a map as well as view all the special's being offer at the selected restaurant.

FIG. 18 Once a restaurant is selected the Cliq can view a detailed list of deals 1801A available at that restaurant and vote 1803A on which deal they would like to utilize. Users can also employ a map view 1801B by pressing the "go to map" button 1802A. Some restaurants might allow multiple deals to be selected by multiple members of the Cliq as long as the number of people in the Cliq. In such case, more than one coupon can be redeemed by the group or "Cliq".

In some embodiments, the restaurants might offer a limited number of coupons, in which case the "Cliq" system will stop issuing coupons once the threshold is reached. A coupon is considered to be issued once the Cliq confirm that they will attend the restaurant associated with it or claim the coupon.

Figure 19:
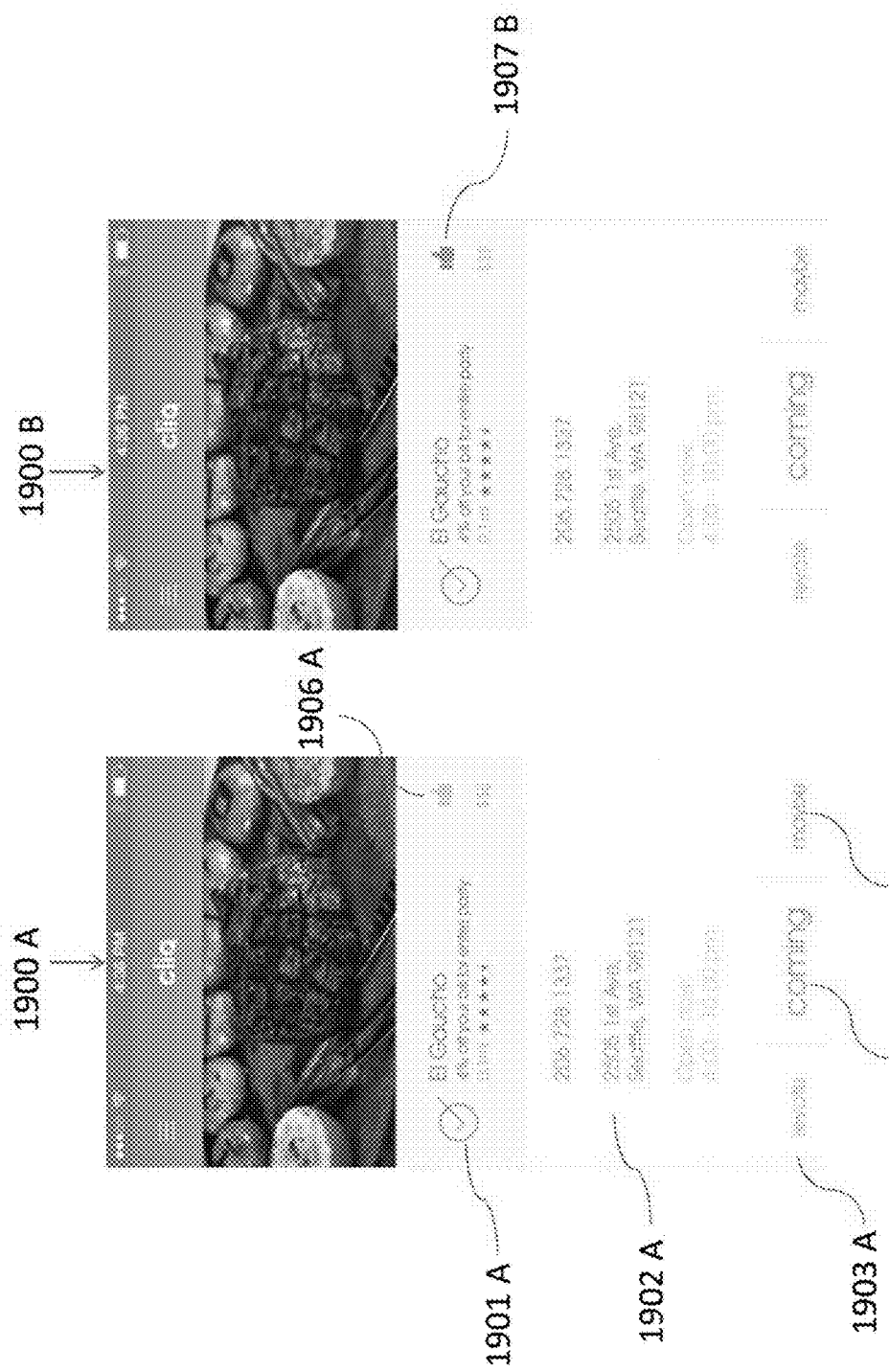
FIG. 19 depicts a group's selected restaurant as well as its rating information, contact information, and address. Further, it depicts the option to revote, confirm attendance, or reply tentatively.

FIG. 19 Once the restaurant and deal are displayed at the top of the page 1901A, users confirm that they are going 1904A, reply tentatively with a maybe 1905A, or request that the party revote 1903A. If the members of the Cliq enjoy their experience with a particular restaurant they can chose to click the "like" button 1906A. Selecting the like button is noted by a color change 1907B.

Figure 20:
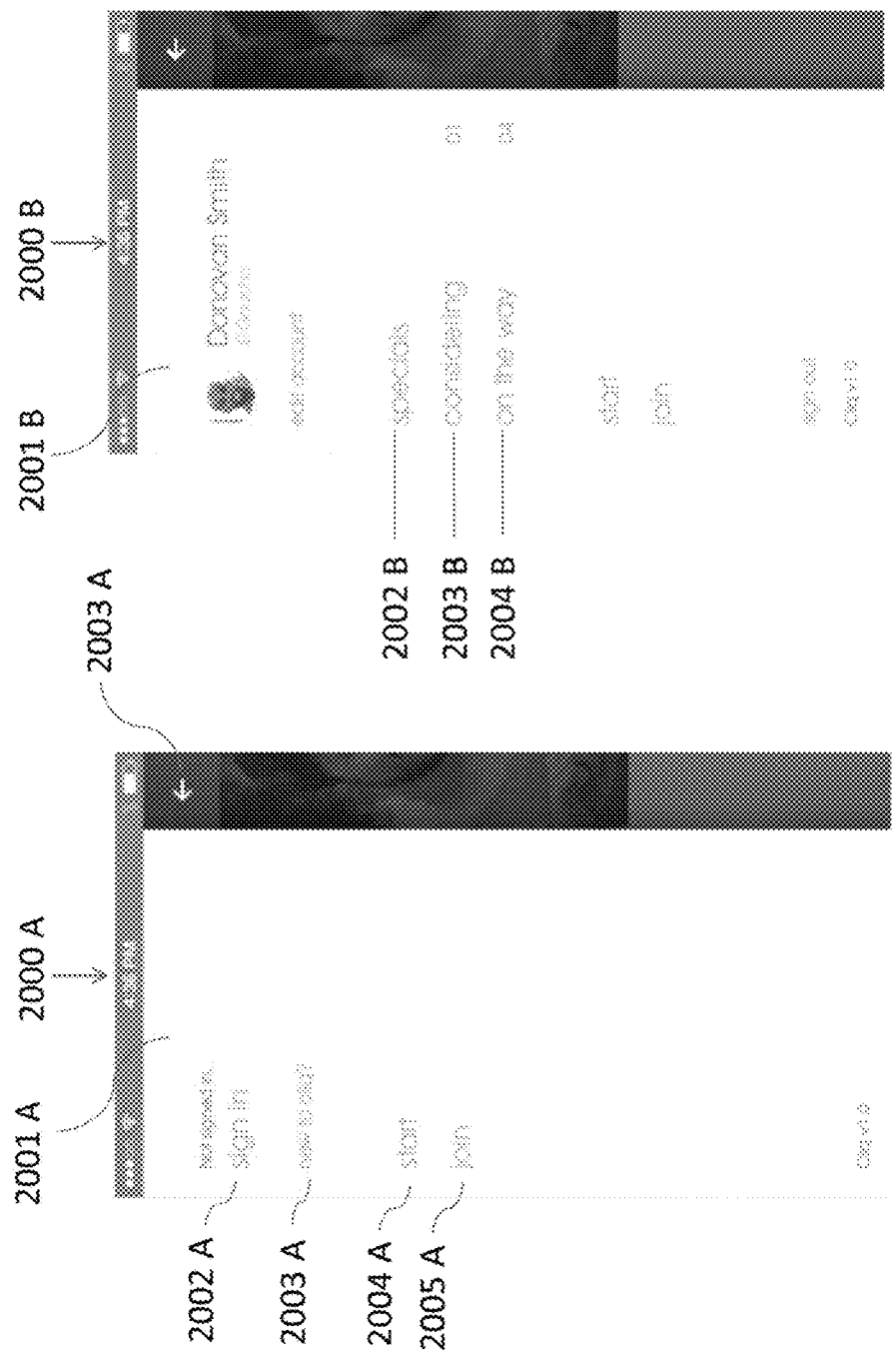
FIG. 20 depicts the account tab and the application's unique options for managers.

FIG. 20 Restaurant managers are presented with additional option on their account tab 2001B. Managers are able to access their "specials" page 2101A, by pressing the "specials" button 2002B. Also, managers can access their "considering page" 2301A, to view parties that are considering their restaurant, by pressing the "considering" button 2003 B. Further, a manager can access their "on the way" page 2301B by pressing the "on the way" button 2004 B and are on the way 2002B.

Figure 21:
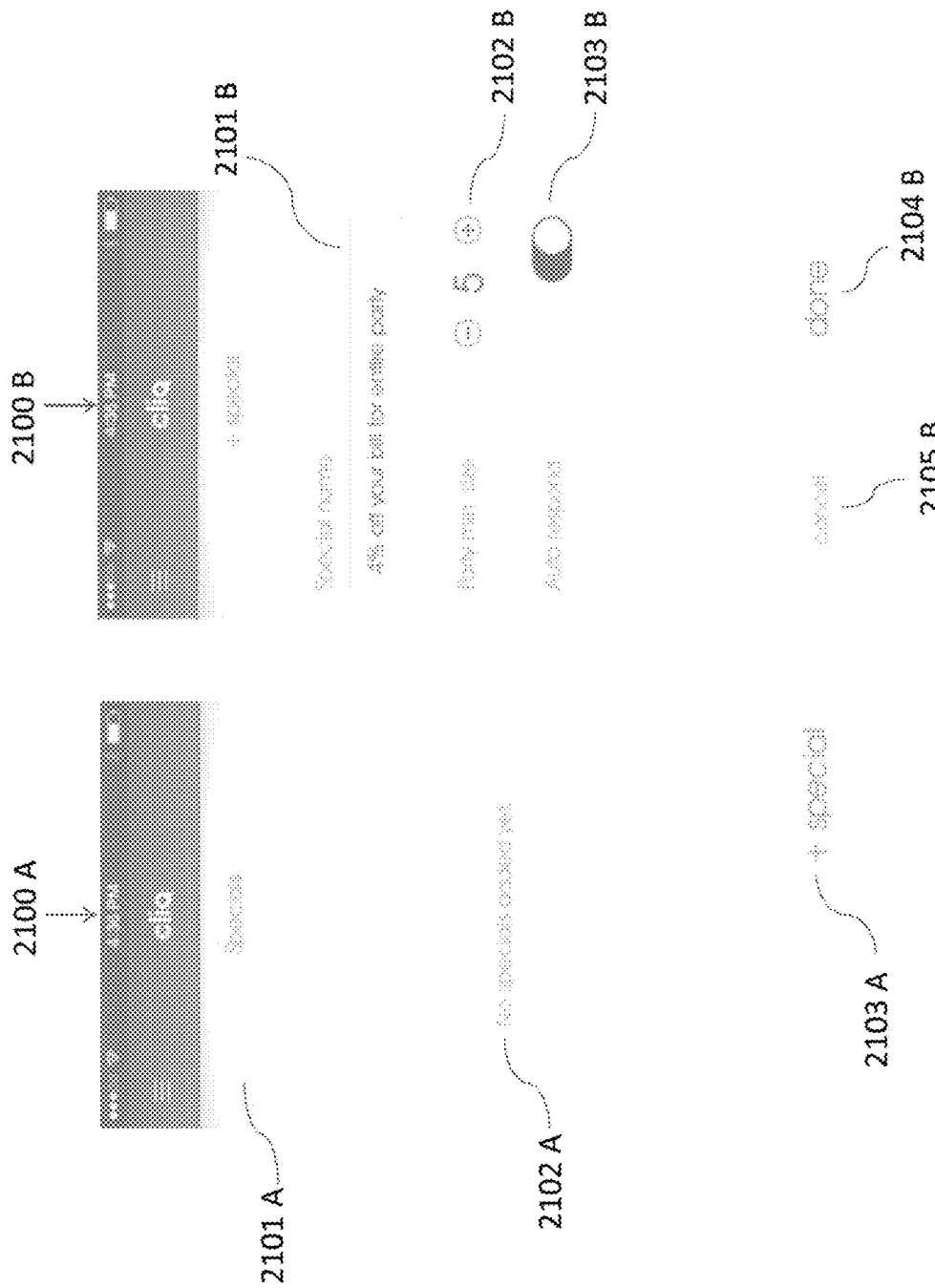
FIG. 21 depicts an empty specials page, and the specials creation page from a manger's view.

FIG. 21 Pressing the "specials button" in 2002B takes the manager to the specials section 2101A. If they have not yet created a special, the specials list 2102A will be blank. If they have created special(s) the field will be populated 2203. The populated list 2203 will also display whether special(s) is/are toggled on 2201 or off 2202. To add a special, the restaurant employee (e.g. manager) would press the "+ special" button 2103A. Managers can name the specials 2101B, adjust the party size required to qualify 2102B, and toggle whether the application should auto respond to Cliq's that meet the requirements 2103B. If they wish to exit the page without saving the special the manager can press the "cancel" button 2105B, if they wish to save the special they can by pressing the "done" button 2104B. The managers are able to add static deals setting parameters such as name, minimum party size, and whether to have the application automatically respond or not. The template presented to restaurant managers to create a deal is not limited to party size and special name. The template can include multiple additional fields so that extra restrictions are associated with the coupon. For example, the coupon can be issued on specific days (if desired), specific times, or time range (e.g. between 5 p.m. and 7 p.m.). The restaurant manager can also choose to specify the number of coupons to issue in a certain time frame (e.g. maximum of 20/day). The restaurant manager can specify the life time of the coupon. For example, coupons for specific specials can be valid for only 3 hours while other coupons can be valid for a week. A coupon lifetime field and other fields discussed earlier can be added to the template therefore allowing the restaurant employee to select the desired value.

Figure 22:
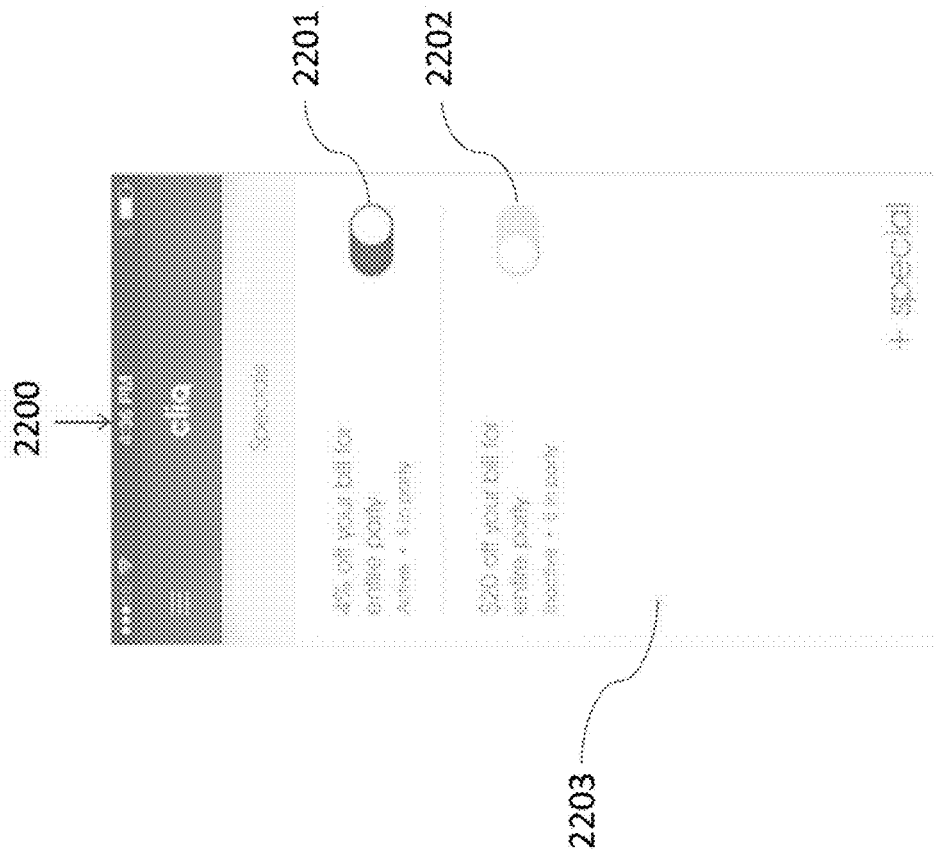
FIG. 22 depicts an active an inactive deal from the manager's specials page.

FIG. 22 shows the vendors customized offers where they can disable/enable the offers to meet business needs.

Figure 23:
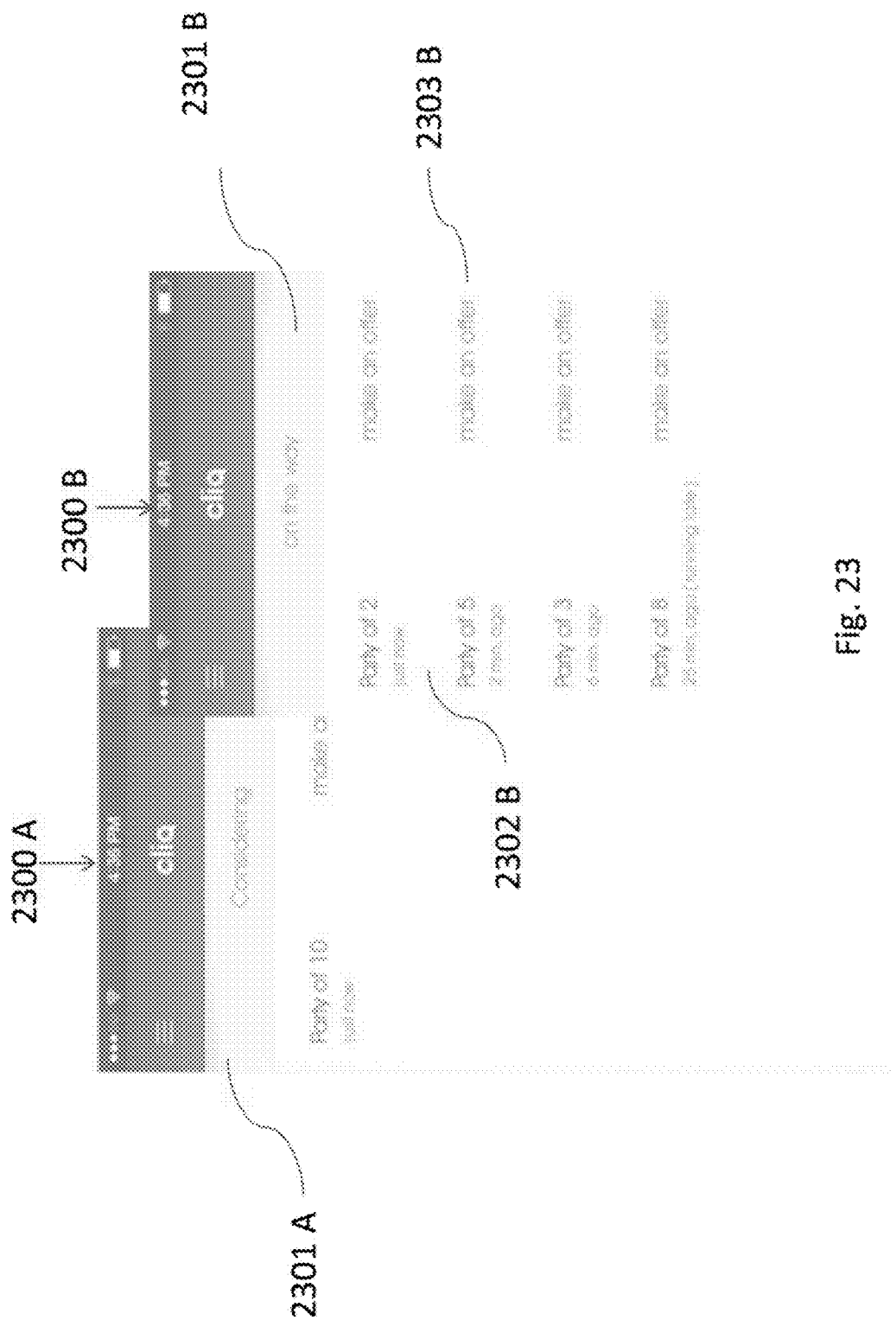
FIG. 23 depicts the manager's considering and on the way sections of the mobile application whereby they can create and offer dynamic deals to Cliqs.

FIG. 23 From the considering page 2301A, and the "on the way" page 2301B, a manager is able to navigate to lists of Cliqs 2302 B and offer customized dynamic deals to specific parties. Pressing the "make an offer" button 2303B takes the manager to the "custom offer" page 2401. From the custom offer page 2401, the manager can name a special 2402 and set a time constraint for responding 2403. Once they are done they can press the "cancel" button 2404 if they decide not to extend the offer or the "done" button 2405 if they wish to send it. Further customization of the offer might be especially useful for parties that are undecided (i.e. Considering) especially if the party is a large group.

Figure 24:
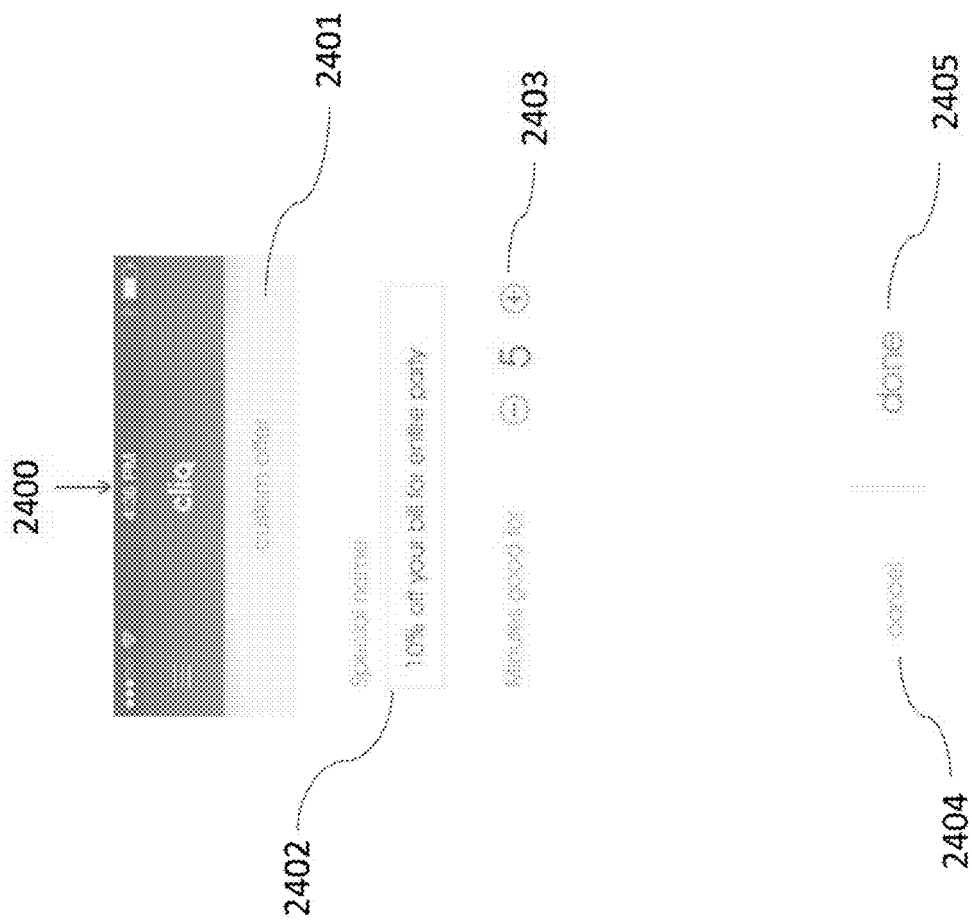
FIG. 24 depicts a manager's screen when creating a dynamic deal.

FIG. 24 shows the customer offer page 2401 where managers can further customize the offer(s) if desired.

Figure 25:
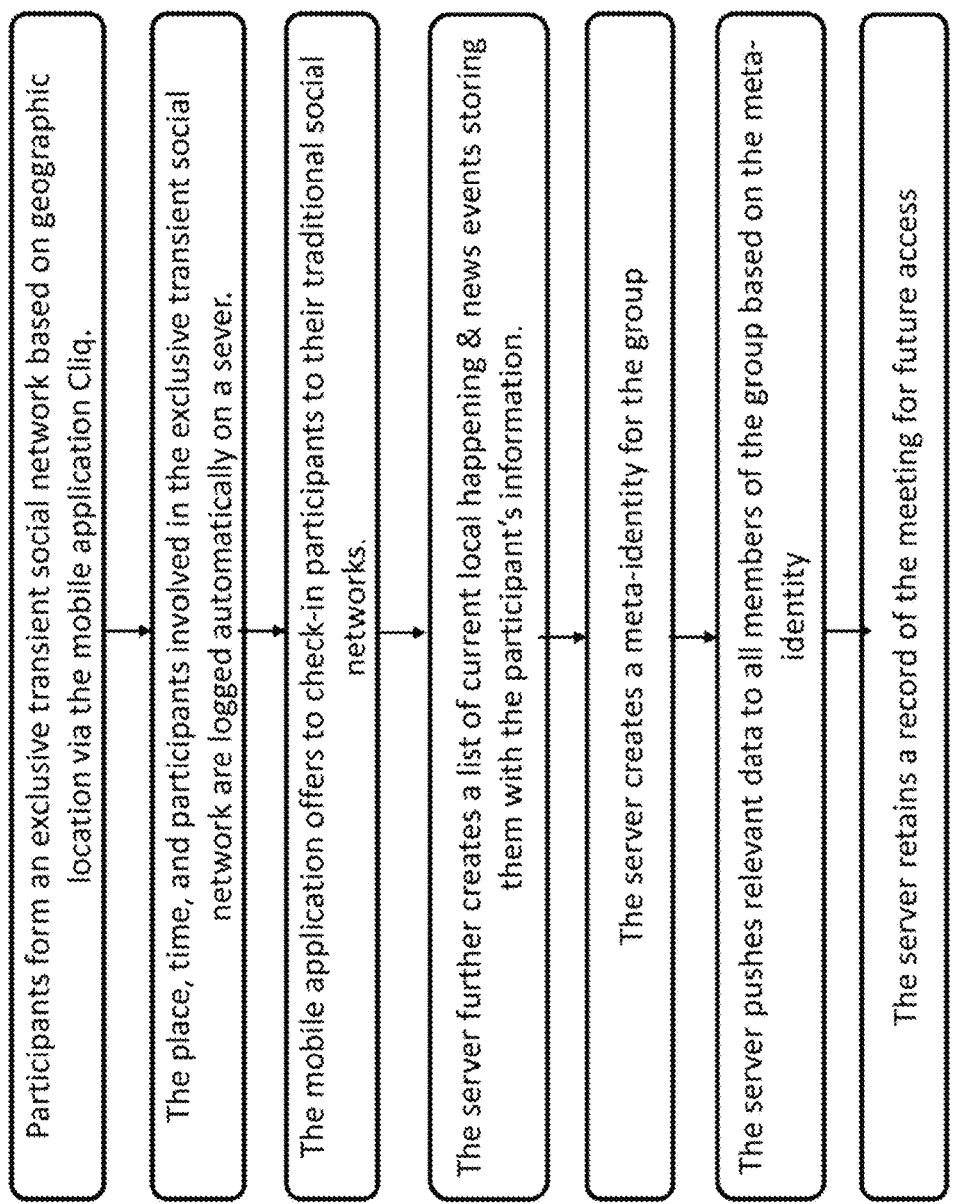
FIG. 25 depicts the transient social network process for a general user.

FIG. 25 shows a flow diagram of the Cliq initiation for a meeting.

Figure 26:
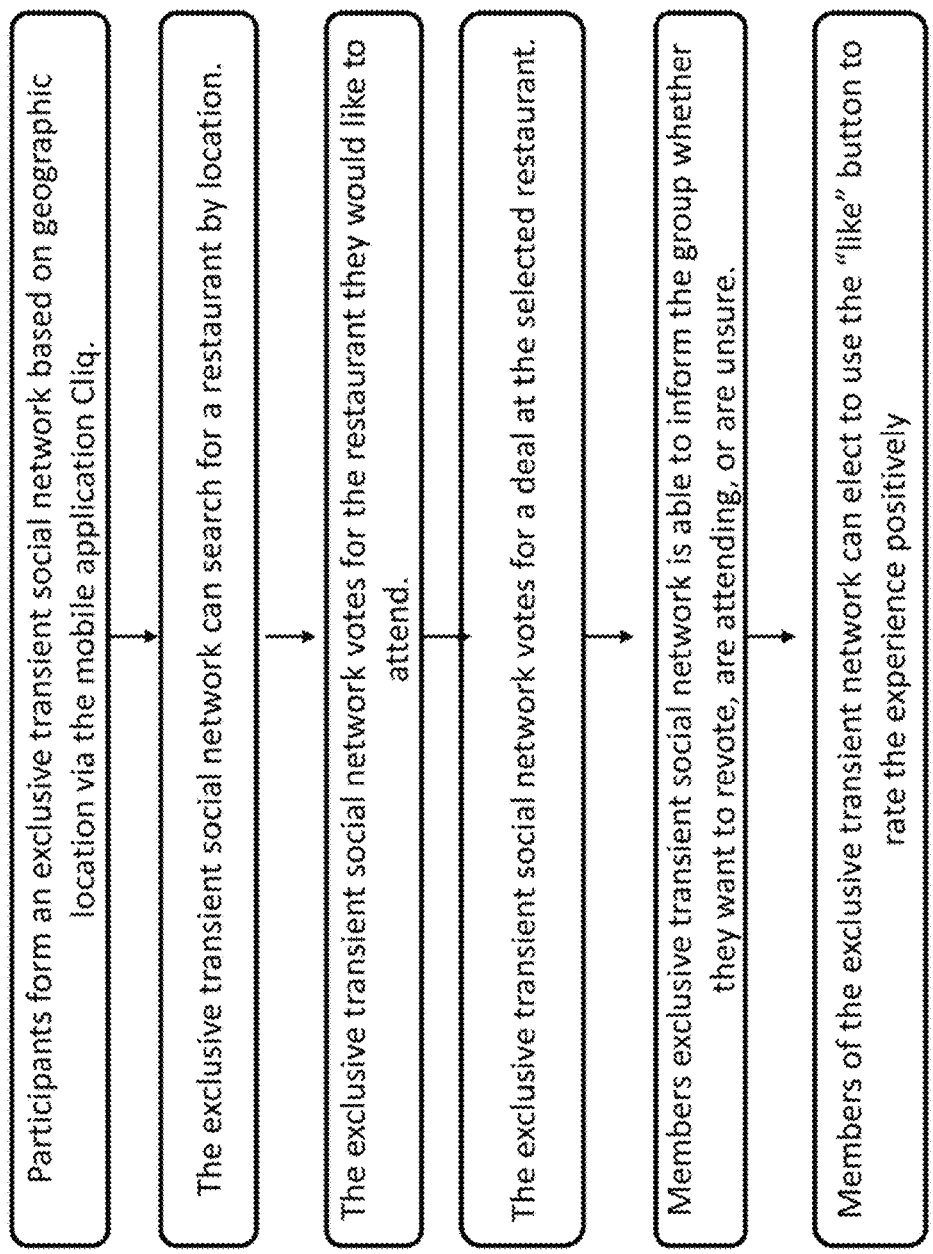
FIG. 26 depicts the transient social network process when the user is a restaurant goer.

FIG. 26 shows a flow diagram of the Cliq initiation to visit an establishment such as restaurant. The depicted steps do not have to occur in the same order, and some steps can occur in parallel. For example, some members of the Cliq may inform the group whether they want are unsure about attending, while other members vote for a deal at a selected restaurant.

Figure 27:
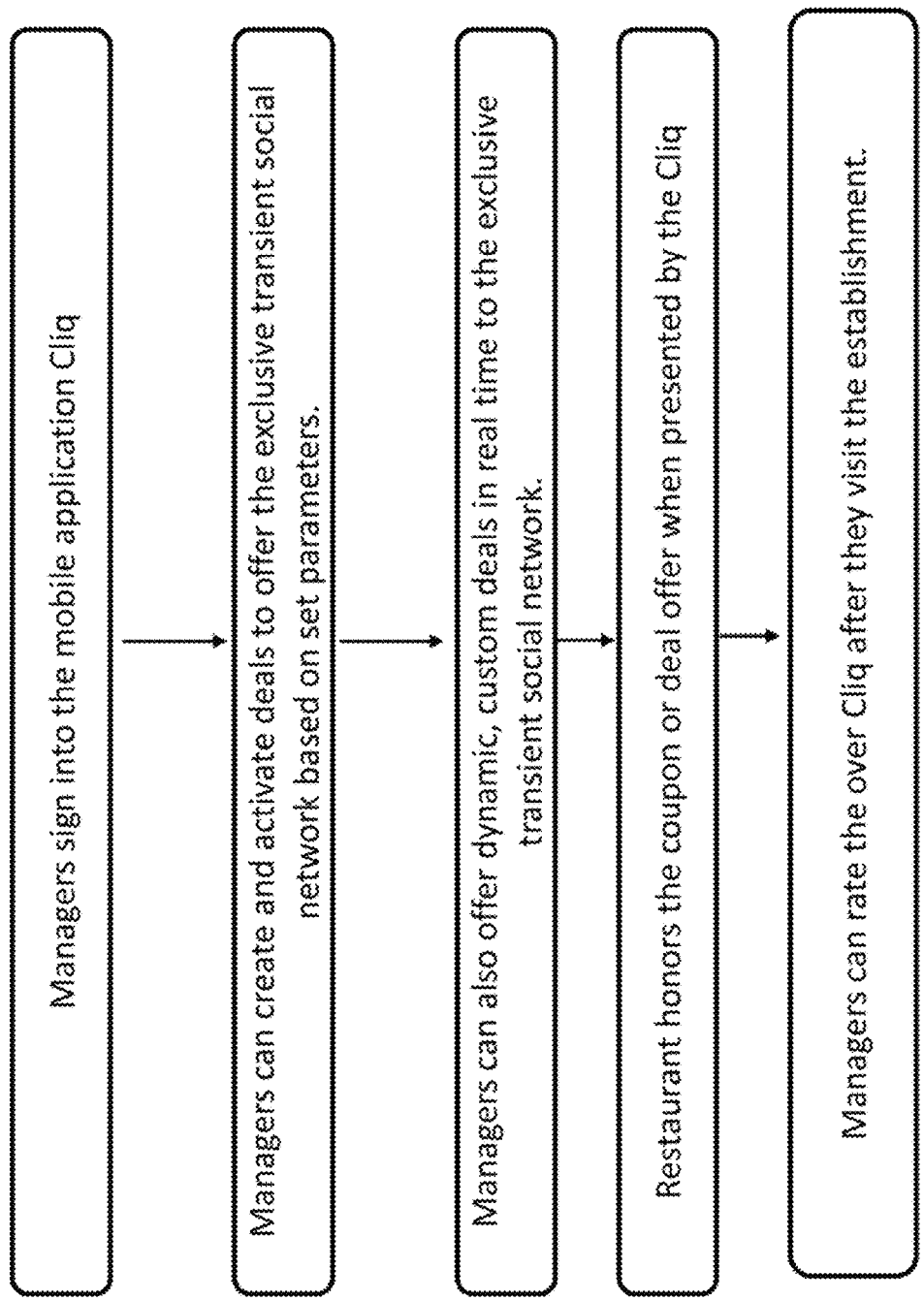
FIG. 27 depicts the restaurant manger's process for interacting with the exclusive transient social network.

FIG. 27 shows a process that the participating vendor go through from signing into the Cliq app to customize an offer, to rating the Cliq after service(s) have been rendered.

The Cliq network is not specific to issuing incentives or promotional coupons that can be redeemed at restaurants. Although, the drawings and examples in this specification were tailored to restaurants, the Cliq network can serve multiple other industries. For example, the Cliq application can allow a store in a mall, such as a clothing store, to make an offer to a "Cliq" of two girls that are present in the mall, and have redeemed coupons from that clothing store in the past.

The Cliq application keeps track of all coupons redeemed by a Cliq or individuals and therefore can provide reports to users in a friendly manner illustrating which places they restaurants they visited most, with who, etc.

The Cliq network can provide establishment with customized reports on foot traffic in the area. For example, the Cliq network can provide the restaurant with a dashboard showing how many cliqs/how many people choose their competitor over them so the restaurant can refine their specials. Also, using the Cliq system can allow the public to see which are the busiest establishments based on various Cliqs decided destinations. The data might also show the restaurants that are trending in a certain area or zip code, or popularity of restaurants serving specific cuisine type.

The coupon serving module or service can interface with other external systems or rely on additional data collected from restaurant employee(s) to balance foot traffic to restaurants. For example, the coupon service might give a Cliq information indicating that there will be a wait at the chosen restaurant since all tables are currently occupied and offer an alternative, such another restaurant with similar cuisine type in the area.

In yet another embodiment of the invention, the coupon issuing service relies on data supplied by the specific restaurant to determine how busy the restaurant is. For example, the server can maintain a profile of the restaurant which includes how many tables the restaurant can seat, and the number of people in a group that the can be accommodated by the different tables. The hostess can use the Cliq app to add or subtract parties as she sees fit. This way the coupon service has good insight into availability and can make recommendations accordingly.

What is claimed is:

1. A method for transmitting at least one content item to a group of participants in an exclusive transient social network based on a meta-identity of the group, the method comprising:

forming the exclusive transient social network between at least two participants through a mobile application installed on the participants' mobile devices;

retrieving, at a server, attributes pertaining to the at least two participants in the exclusive transient social network;

creating, at a server, the meta-identity for the exclusive transient social network by weighing and combining the retrieved attributes;

deriving relevant data from the meta-identity; and transmitting from a server, to the participants' mobile devices, content items based on the derived relevant data, wherein at least one of the content item is an exclusive digital coupon associated with a vendor that offers products or services, and wherein the exclusive digital coupon is dynamically created based on predefined criteria associated with the vendor and the derived relevant data;

transmitting the content items to the participants' mobile devices.

2. The method of claim 1, wherein the mobile application automatically posts a location of the vendor to a second social network associated with at least one of the participants.

3. The method of claim 1, wherein the exclusive digital coupon is selectable by the participants for later redemption.

4. The method of claim 1, wherein a social network profile for at least one participant is further augmented with at least one of: the date and time at which the exclusive transient social network is formed, a geographical location of the exclusive transient social network, a reason for meeting, nearby happenings, and current news events.

5. The method of claim 1, wherein the exclusive transient social network dissipates automatically when the participants separate.

6. The method of claim 1, wherein the mobile application prompts a user to join an existing exclusive transient social network when the user is in a vicinity of participants in the existing exclusive transient social network.

7. The method of claim 6, wherein the participants of the existing exclusive transient social network can communicate with each other or with a location manager can communicate with the exclusive transient social network.

8. The method of claim 1, wherein the content items include advertisements, or upcoming events.

9. The method of claim 1, wherein the attributes include age, gender, location, recent activities, hobbies, or preferences.

10. The method of claim 1, wherein the participants in the exclusive transient social network can search for specific businesses or services to prompt the generation of a digital offer or discount associated with the businesses or services, through the mobile application.

11. The method of claim 1, wherein the participants in the exclusive transient social network can vote on which of the exclusive digital coupon to select for redemption, through the mobile application.

12. The method of claim 1, wherein the participants in the exclusive transient social network can rate the content items transmitted from the server.

13. The method of claim 1, wherein the vendor associated with one of the content items can rate the exclusive transient social network or at least one participant in the exclusive transient social network.

14. The method of claim 1, wherein the vendor can join or communicate with the exclusive transient social network when the participants select the exclusive digital coupon.

15. The method of claim 1, wherein the vendor associated with the exclusive digital coupon can further customize the exclusive digital coupon when it is not selected by the participants.

16. The method of claim 1, wherein the predefined criteria is at least one of: time of the day, number of participants in the exclusive transient social network, and previous ratings of at least one of the participants in the exclusive transient social network.

17. A system for issuing an exclusive and customized digital coupons, comprising:

server circuitry configured to:
 receive and register information about a formation of an entity consisting of at least one participant;
 compare a characteristic of the profile to a stored vendors predefined criteria by accessing a central repository of electronically stored predefined criteria associated with the vendors;
 a generate at least one exclusive and redeemable digital coupon upon determining that the profile has characteristics that match at least one vendor's predefined criteria; and
 send the at least one exclusive and redeemable coupon to a computing device associated with the entity over a communication link.

18. The system of claim 17, wherein the vendor predefined criteria is a time of the day.

19. A non-transitory computer readable medium storing instructions, which when executed by one or more processors, cause performance of:

receiving information about a formation of an entity that consist of at least one participant;
 extracting at least some of the received information to create at least one profile parameter for the entity;
 comparing the at least one profile parameter to a stored predefined criteria associated with different vendors;
 generating at least one customized digital coupon upon determining that the at least one profile parameter matches at least one vendor's predefined criteria; and
 sending the at least one customized digital coupon to a remote computing device over a communications link.

* * * * *